(12) United States Patent
Park et al.

(10) Patent No.: US 12,477,582 B2
(45) Date of Patent: Nov. 18, 2025

(54) UPLINK RESOURCE AVAILABILITY

(71) Applicant: QUALCOMM Incorporated, San Diego, CA (US)

(72) Inventors: Changhwan Park, San Diego, CA (US); Timo Ville Vintola, San Diego, CA (US); Valentin Alexandru Gheorghiu, Yokohama (JP)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 18/053,354

(22) Filed: Nov. 7, 2022

(65) Prior Publication Data

US 2023/0217496 A1 Jul. 6, 2023

Related U.S. Application Data

(60) Provisional application No. 63/266,514, filed on Jan. 6, 2022.

(51) Int. Cl.
*H04W 74/0808* (2024.01)
*H04W 72/0446* (2023.01)
*H04W 72/1268* (2023.01)

(52) U.S. Cl.
CPC ... *H04W 74/0825* (2013.01); *H04W 72/0446* (2013.01); *H04W 72/1268* (2013.01)

(58) Field of Classification Search
CPC ......... H04W 74/0825; H04W 72/0446; H04W 72/1268
See application file for complete search history.

(56) References Cited

U.S. PATENT DOCUMENTS

2008/0102880 A1* 5/2008 Gholmieh ............ H04W 52/245
455/552.1
2013/0322279 A1* 12/2013 Chincholi ............ H04L 43/106
370/252

(Continued)

FOREIGN PATENT DOCUMENTS

EP 2508023 B1 * 1/2014 ....... H04L 25/03343

OTHER PUBLICATIONS

International Search Report and Written Opinion dated Feb. 16, 2023 from corresponding PCT Application No. PCT/US2022/079507.

(Continued)

*Primary Examiner* — Kenny S Lin
(74) *Attorney, Agent, or Firm* — Arent Fox, LLP

(57) ABSTRACT

Aspects of the present disclosure relate to wireless communications, and more particularly, to techniques and devices for uplink gap configuration and determination of uplink resources after uplink gap distribution. Certain aspects are directed to an apparatus for wireless communications at a user equipment (UE). The UE may include a memory comprising instructions, and one or more processors configured to execute the instructions. In some examples, the instructions may cause the apparatus to obtain, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the apparatus.

20 Claims, 13 Drawing Sheets

(56) References Cited

U.S. PATENT DOCUMENTS

| | | | | |
|---|---|---|---|---|
| 2014/0064195 | A1* | 3/2014 | Li | H04W 56/00 |
| | | | | 370/329 |
| 2020/0107358 | A1* | 4/2020 | Basu Mallick | H04L 1/1812 |
| 2020/0329523 | A1* | 10/2020 | Yi | H04W 72/51 |
| 2022/0407669 | A1* | 12/2022 | Zhang | H04W 72/23 |
| 2023/0217240 | A1* | 7/2023 | Jung | H04W 8/186 |
| | | | | 455/422.1 |
| 2023/0217421 | A1* | 7/2023 | Park | H04W 72/0446 |
| | | | | 370/280 |
| 2023/0262634 | A1* | 8/2023 | Kim | H04W 56/0045 |
| | | | | 370/350 |
| 2024/0224209 | A1* | 7/2024 | Lee | H04W 76/30 |

OTHER PUBLICATIONS

Moderator (Apple): "Email discussion summary for (101-e] [121] NR_RF FR2_enh2_Part_2", 3GPP Draft; R4-2119921, 3rd Generation Partnership Project (3GPP), Mobile Competence Centre; 650, Route Des Lucioles; F-06921 Sophia-Antipolis Cedex ; France; vol. RAN WG4, No. Electronic Meeting; Nov. 1-Nov. 12, 2021 Nov. 12, 2021 (Nov. 12, 2021), XP052082298, Retrieved from the Internet: URL:https://ftp.3gpp.org/tsg_ran/WG4_Radio/TSGR4_101-e/Docs/R4-2119921.zip R4-2119921 Summary (101-e] (121] NR_RF_FR2_enh2_Part_2_round2_final.docx [retrieved on Nov. 12, 2021].

New Postcom: "Considerations on RACH failure hanclling on SCell", 3GPP Draft; R2-121189 Considerations on RACH Failure Handling on SCELL, 3rd Generation Partnership Project (3GPP), Mobile Competence Centre; 650, Route Des Lucioles; F-06921 Sophia-Antipolis Cedex France, vol. RAN WG2, No. Jeju, Korea; Mar. 26-Mar. 30, 2012, Mar. 20, 2012 (Mar. 20, 2012), XP050606194, [retrieved on Mar. 20, 2012].

Interdigital et al: "TB processing over multiple slots", 3GPP Draft; R12104860, 3rd Generation Partnership Project (3GPP), Mobile Competence Centre; 650, Route Des Lucioles; F-06921 Sophia-Antipolis Cedex ; France; vol. AN WGI, No. e-Meeting; May 10-May 27, 2021 May 12, 2021 (May 12, 2021), XP052011081, Retrieved from the Internet: URL:https://ftp.3gpp.org/tsg_ran/WG1_RL1/TSGR1_105-e/Docs/RI-2104860_zip RI-2104860_105e_cov_AI8812_TBoMS.docx [retrieved on May 12, 2021].

* cited by examiner

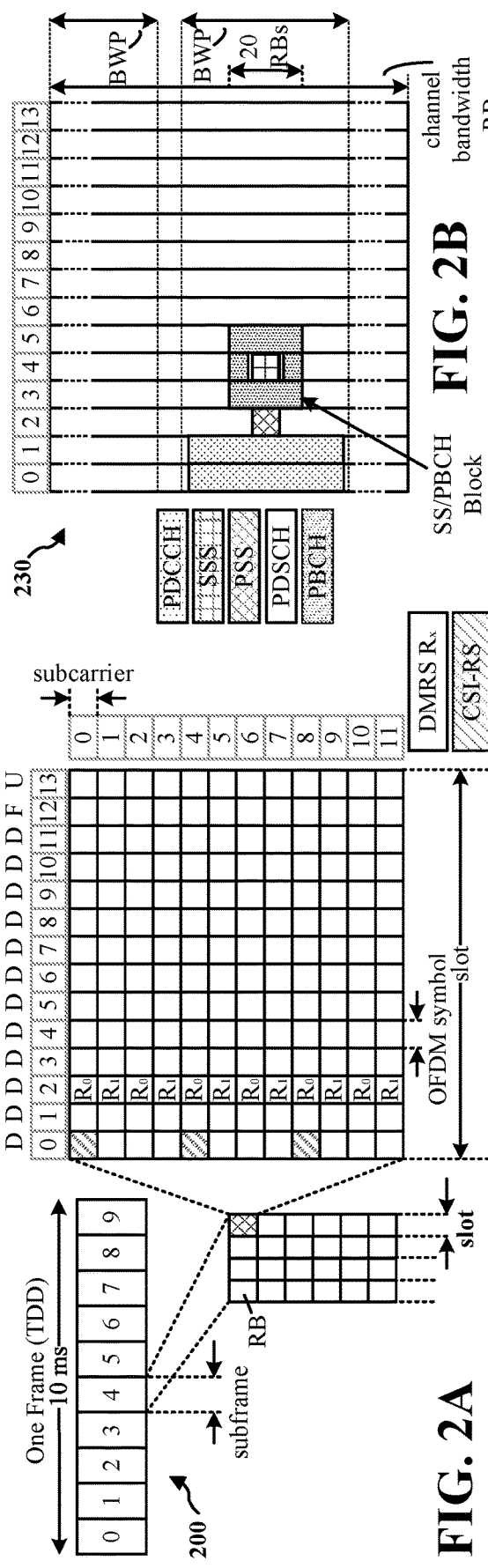
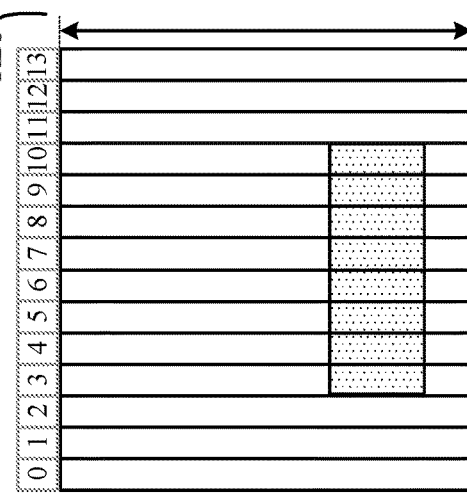
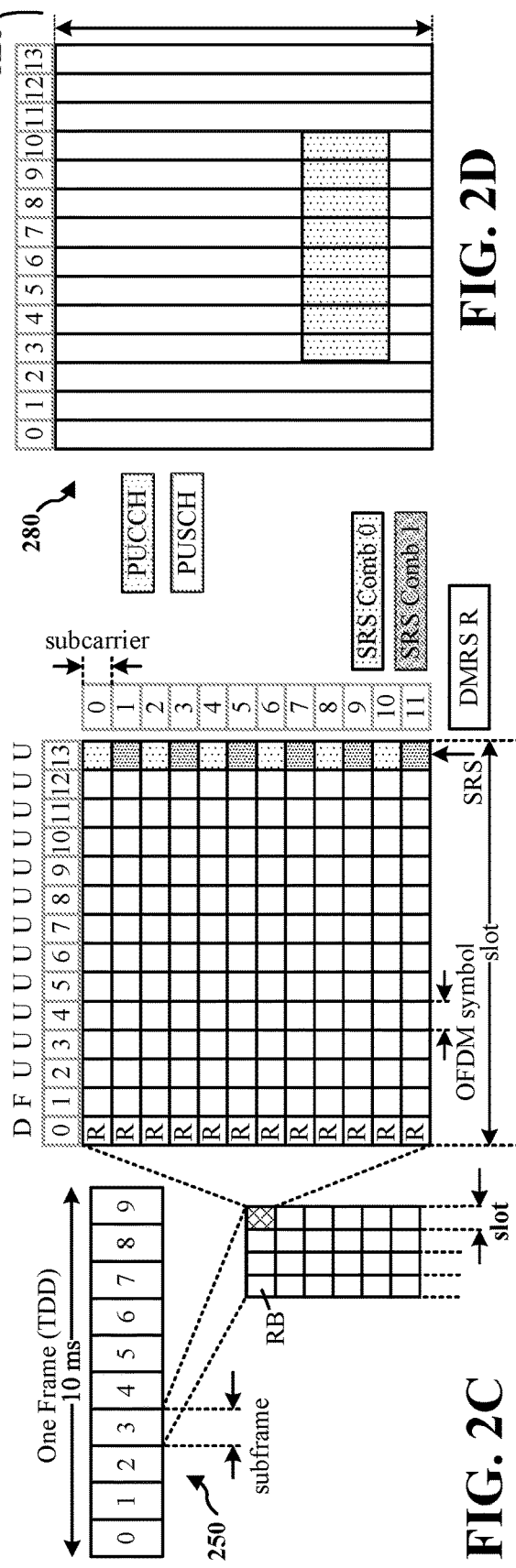
FIG. 2A
FIG. 2B
FIG. 2C
FIG. 2D

UPLINK RESOURCE AVAILABILITY

CROSS REFERENCE TO RELATED APPLICATION(S)

This application claims the benefit of U.S. Provisional Application Ser. No. 63/266,514, entitled "UPLINK RESOURCE AVAILABILITY" and filed on Jan. 6, 2022, the disclosure of which is expressly incorporated by reference herein in its entirety.

BACKGROUND

Technical Field

The present disclosure generally relates to communication systems, and more particularly, to devices and method for obtaining uplink resources while using an uplink gap configuration.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to an apparatus for wireless communications. In some examples, the apparatus includes a memory comprising instructions, and one or more processors configured to execute the instructions. In some examples, the one or more processors are configured to cause the apparatus to obtain, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the apparatus. In some examples, the one or more processors are configured to cause the apparatus to detect a communication event corresponding to a first uplink slot of the one or more uplink slots. In some examples, the one or more processors are configured to cause the apparatus to deactivate the first uplink slot of the one or more uplink slots in response to the communication event. In some examples, the one or more processors are configured to cause the apparatus to output, for transmission to the base station, a first signal via the first uplink slot in response to the communication event.

Certain aspects are directed to an apparatus for wireless communications. In some examples, the apparatus includes a memory comprising instructions, and one or more processors configured to execute the instructions. In some examples, the one or more processors are configured to cause the apparatus to obtain, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the apparatus. In some examples, the one or more processors are configured to cause the apparatus to obtain, from the base station, scheduling for repeat transmissions of an uplink signal via a plurality of uplink slots within the first time window, the plurality of uplink slots including a first uplink slot of the one or more uplink slots activated as uplink gaps. In some examples, the one or more processors are configured to cause the apparatus to output the uplink signal for one or more of the repeat transmissions to the base station via the plurality of uplink slots not including the first uplink slot.

Certain aspects are directed to a method of wireless communications at a user equipment (UE). In some examples, the method includes obtaining, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the UE. In some examples, the method includes detecting a communication event corresponding to a first uplink slot of the one or more uplink slots. In some examples, the method includes deactivating the first uplink slot of the one or more uplink slots in response to the communication event. In some examples, the method includes outputting, for transmission to the base station, a first signal via the first uplink slot in response to the communication event.

Certain aspects are directed to a method of wireless communications at a user equipment (UE). In some examples, the method includes obtaining, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the UE. In some examples, the method includes obtaining, from the base station, scheduling for repeat transmissions of an uplink signal via a plurality of uplink slots within the first time window, the plurality of uplink slots including a first uplink slot of the one or more uplink slots activated as uplink gaps. In some examples, the method includes outputting the uplink signal for one or more of the repeat transmissions to the base station via the plurality of uplink slots not including the first uplink slot.

Certain aspects are directed to an apparatus for wireless communications. In some examples, the apparatus includes means for obtaining, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the apparatus. In some examples, the apparatus includes means for detecting a communication event corresponding to a first uplink slot of the one or more uplink slots. In some examples, the apparatus includes means for deactivating the first uplink slot of the one or more uplink slots in response to the communication event. In some examples, the apparatus includes means for outputting, for transmission to the base station, a first signal via the first uplink slot in response to the communication event.

Certain aspects are directed to an apparatus for wireless communications. In some examples, the apparatus includes means for obtaining, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the UE. In some examples, the apparatus includes means for obtaining, from the base station, scheduling for repeat transmissions of an uplink signal via a plurality of uplink slots within the first time window, the plurality of uplink slots including a first uplink slot of the one or more uplink slots activated as uplink gaps. In some examples, the apparatus includes means for outputting the uplink signal for one or more of the repeat transmissions to the base station via the plurality of uplink slots not including the first uplink slot.

Certain aspects are directed to a non-transitory computer-readable medium having instructions stored thereon that, when executed by a user equipment (UE), cause the UE to perform operations. In some examples, the operations include obtaining, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the UE. In some examples, the operations include detecting a communication event corresponding to a first uplink slot of the one or more uplink slots. In some examples, the operations include deactivating the first uplink slot of the one or more uplink slots in response to the communication event. In some examples, the operations include outputting, for transmission to the base station, a first signal via the first uplink slot in response to the communication event.

Certain aspects are directed to a non-transitory computer-readable medium having instructions stored thereon that, when executed by a user equipment (UE), cause the UE to perform operations. In some examples, the operations include obtaining, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the UE. In some examples, the operations include obtaining, from the base station, scheduling for repeat transmissions of an uplink signal via a plurality of uplink slots within the first time window, the plurality of uplink slots including a first uplink slot of the one or more uplink slots activated as uplink gaps. In some examples, the operations include outputting the uplink signal for one or more of the repeat transmissions to the base station via the plurality of uplink slots not including the first uplink slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
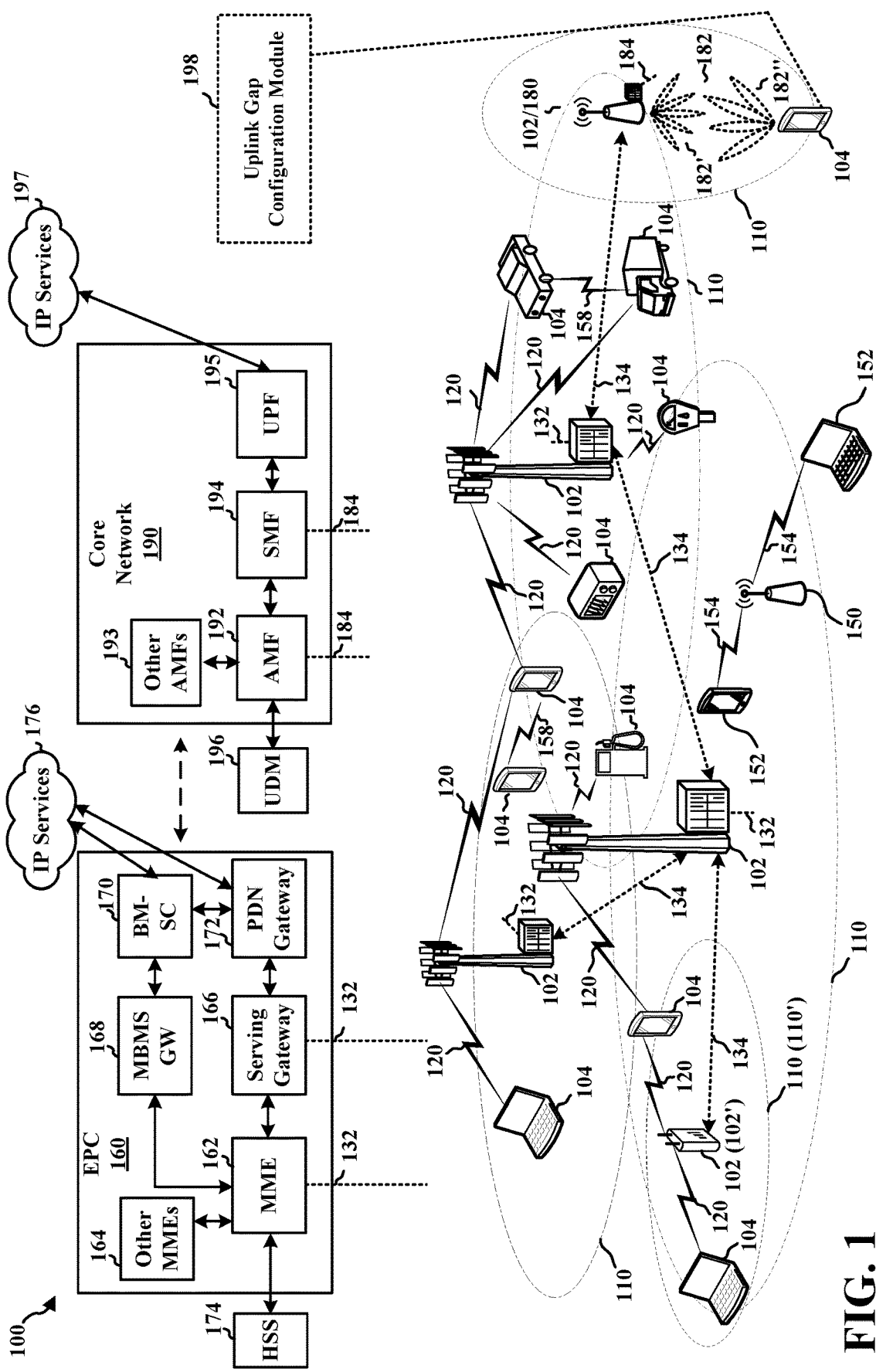
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A base station may provide a user equipment (UE) with information for configuring an uplink gap at the UE. For example, the base station may provide the UE with one or more uplink gap pattern (ULGP) configurations, as well as an uplink gap length (UGL) and a time window or uplink gap repetition periodicity (UGRP) corresponding to each of the one or more ULGPs. For instance, the UGL may indicate a number of consecutive static uplink slots configured as an uplink gap, per UGRP. For example, if the UE is communicating using a 120 kHz subcarrier spacing (SCS) (e.g., wherein the duration of each slot is ⅛ milliseconds (ms)), the UGRP is 20 ms, and the UGL is 1 ms, then the UE may use eight consecutive static uplink slots every 20 ms to perform an uplink gap processes.

During an uplink slot that has been configured as an uplink gap, the UE may perform self-calibration and second monitoring processes, during which the UE may not transmit uplink signaling to the base station. In one example, during an uplink gap, the UE may perform proximity detection to determine if there is a person nearby. Such proximity detection may provide the UE with information that controls a transmission power of the UE (e.g., a lower transmission power may be applied if a person is close to the UE, relative to a transmission power when a person is not close to the UE). In another example, the UE may transmit a low power signal (e.g., a signal that will not be received by the base station) that the UE will receive and use to perform self-calibration. Here, the UE may determine whether the power of the received signal a power that the UE expected. Based on this information, the UE may calibrate RF components and transmit/receive logic (e.g., power amplified (PA), transceiver, etc.). In yet another example, the UE may perform self-calibration based on UE temperature. In this example, an internal temperature of the UE may trigger the UE to perform recalibration of components or perform tests to confirm that the components are working correctly. Thus, if the UE has been transmitting for a long duration of time it may heat up, and the UE may want to make sure everything still works correctly at that temperature. It should be noted that the examples provided above are not limiting, and any suitable self-calibration and/or monitoring process may be performed by the UE during an uplink gap.

During an uplink slot that has been configured as an uplink gap, the UE is not expected to be scheduled with an uplink transmission by the base station. Thus, depending on the uplink/downlink slot configuration (e.g., time-division duplex (TDD) pattern), a scheduling delay (e.g., K1) between a downlink transmission and an uplink acknowledgment/negative-acknowledgement (ACK/NACK), the ULGP pattern, etc., downlink transmissions may be blanked (e.g., no ACK/NACK provided in response to the downlink transmission due to an uplink gap) which results in loss of downlink throughput and downlink communication opportunities.

In some examples, the UE and the base station may use certain timers to control aspects of wireless communication between the devices. The timers may include timer-based bandwidth part (BWP) switching, discontinuous reception (DRX) timers, time alignment (TA) timers, etc. However, an uplink gap may prevent the UE from providing the base station with uplink data in response to a timer expiring. As such, the uplink gap may result in a failed connection or communication between the UE and the base station.

Thus, in certain aspects, the UE may uniformly distribute the use of an uplink gap process throughout a UGRP. For example, using a consecutive number of uplink slots will effectively blank a relatively long and continuous portion of the UGRP, potentially preventing the UE from responding to timers for a long period of time. Thus, by uniformly, or evenly, distributing the uplink slots configured for uplink gap throughout a UGRP (e.g., assigning uplink gaps to every other uplink slot instead of every consecutive uplink slot), the UE may avoid long periods of blanked downlink slots. As such, the UE may have more opportunity to take action when a timer expires or before expiration of the timer.

As discussed, a UE may not expect to be scheduled with an uplink transmission during an uplink slot that is configured as an uplink gap slot. Moreover, because the uplink slot configured as an uplink gap is a static slot (e.g., an uplink slot corresponding to a TDD uplink/downlink pattern), the uplink gap slot applies the same timing advance (TA) as other slots of the TDD pattern. Accordingly, once a TA becomes invalid (e.g., due to timeAlignmentTimer expiration), the UE will no longer be able to communicate with the base station. As such, the expiration of the TA timer may trigger the UE to initiate a random access (e.g., PRACH) procedure with the base station so that the TA can be updated and a new TA timer established. Alternatively, if the TA timer is nearing expiration, the base station may transmit a random access command to the UE, instructing the UE to initiate the random access procedure.

However, if the UE has configured one or more uplink slots as uplink gap slots within a UGRP time window, then there is a likelihood that the TA timer will expire during an uplink gap slot or a downlink slot that has been blanked due to the uplink gap slot. As such, the UE may not be capable of transmitting an uplink RACH message over the uplink gap slot in response to the timer expiring or in response to a downlink RACH command.

Thus, in certain aspects, when a TA becomes invalid or when a TA timer approaches expiration, and when resources (e.g., Msg2/4 or MsgA/B) used for RACH overlap with an uplink gap slot, then the UE may temporarily deactivate one or more uplink gap slots (e.g., reconfigure the uplink gap slot to operate as an uplink slot for communication) so that the UE can be scheduled to transmit uplink signaling over the slot. In one example, the UE may temporarily deactivate all uplink gap slots in one or more UGRPs so that the UE is able to transmit all RACH uplink communications related to a TA update. In this example, the UE may reactivate any remaining uplink slots within the one or more UGRPs to uplink gap slots after the UE obtains a valid TA and the valid TA is applied at the UE. In another example, the UE may deactivate only the uplink gap slots within a UGRP that will be used by the UE to obtain a valid TA, while keeping active any remaining uplink gap slots that are not affected by the RACH procedure. Thus, in either example, the UE may deactivate uplink gap slots in order to receive and acknowledge RACH commands (e.g., transmitted over physical downlink control channel (PDCCH)) from the base station, and/or to transmit uplink signaling (e.g., RACH signaling) over uplink slots that were previously configured as uplink gap slots.

In certain aspects, a UE may detect radio link failure (RLF) of a radio link used for communication with a base station, and/or detect beam failure of a beam used by the UE for communication with the base station. In some examples, the UE may determine RLF based downlink signal quality (e.g., reference signal received power (RSRP), etc) Similarly, the UE may determine beam failure if the UE detects that downlink signal quality is below a threshold, e.g., 10% block error rate (BLER) of a downlink channel. In case of either an RLF or a beam failure, the UE may initiate a random access procedure to reestablish the radio link, and/or for beam recovery.

However, if the UE has configured one or more uplink slots as uplink gap slots within a UGRP time window, then there is a likelihood that an uplink gap slot or a downlink slot that has been blanked due to the uplink gap slot will interrupt a radio link reestablishment and/or beam recovery process. For example, an uplink gap slot may prevent the UE from transmitting an uplink RACH message in response to the RLF or beam failure.

Thus, in certain aspects, the UE may deactivate an uplink gap slot to enable the UE to be scheduled for uplink transmission over the corresponding uplink slot. For example, the UE may deactivate one or more uplink gaps for uplink slots that the UE expects to use for uplink communications (e.g., PRACH/RACH) for radio link and/or beam failure recovery. In another example, the UE may temporarily deactivate all uplink gaps during radio link and/or beam failure recovery, then reactivate any uplink gap slots for uplink slots that were unused for the radio link and/or beam failure recovery process. Thus, in either example, the UE may deactivate uplink gap slots in order to receive and acknowledge random access commands (e.g., transmitted over physical downlink control channel (PDCCH)) from the base station, and/or to transmit uplink signaling (e.g., RACH signaling) over uplink slots that were previously configured as uplink gap slots.

In certain aspects, a UE may receive, from a base station, downlink control information for a configured grant physical uplink shared channel (CG-PUSCH). In a type 1 CG-PUSCH transmission, the base station may configure, via radio resource control (RRC) messaging, a time domain resource allocation, a periodicity of resources, an offset, a start symbol, a number of repetitions, and a length of the PUSCH. In a type 2 CG-PUSCH transmission, the base station may configure the UE with only the periodicity and the number of repetitions via RRC messaging, whereas the other parameters may be configured through downlink control information (DCI). Thus, the base station may preconfigure the UE with CG resources so that the UE may transmit uplink data using the CG resources without transmitting a scheduling request (SR) and receiving an UL grant as dynamic grant (DG). CG-PUSCH provides the UE with the ability to rapidly provide uplink communications (e.g., UCI, ACK, etc.), thereby improving throughput and reducing latency in communications.

However, if the UE has configured one or more uplink slots as uplink gap slots within a UGRP time window, then there is a likelihood that an uplink slot that has been scheduled for CG will be configured as an uplink gap slot. In this example, the configuration as an uplink gap slot will interrupt uplink communications because the UE will not be able to communicate over the uplink slot configured as an uplink gap.

Thus, in certain aspects, the UE may deactivate an uplink gap slot to enable the UE to transmit over the corresponding uplink slot when that slot is scheduled by CG. Accordingly, by deactivating an uplink gap, the UE can use the uplink slot for uplink transmission according to the CG and maintain the ability to rapidly provide uplink communications (e.g., UCI, ACK, etc.), thereby improving throughput and reducing latency in communications.

In certain aspects, a base station may configure/schedule a UE for uplink transmissions over multiple consecutive uplink slots (e.g., PUSCH repetition over multiple uplink slots). For example, if conditions warrant (e.g., a radio link quality between the UE and the base station has dropped below a threshold), the base station may configure the UE to repeat an uplink signal to the base station over multiple uplink slots. However, the base station may schedule an uplink slot that the UE has configured as an uplink gap slot as part of the multiple uplink slots for PUSCH repetition.

Thus, in such a case, the UE may perform one of two options. In a first option, the UE may puncture the PUSCH repetition by not transmitting over the uplink slot configured as an uplink gap but transmitting the repeated uplink signal in all other uplink slots not configured as uplink gaps. In a second option, the UE may puncture the PUSCH repetition but also transmit the repeated uplink signal in another uplink slot following the uplink gap slot. In either option, the UE may not deactivate the uplink gap, but rather skips the uplink transmission scheduled with the uplink gap or reschedules the uplink transmission for another consecutive uplink slot.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

In certain aspects, the base station may query the UE to determine whether the UE can use an uplink gap configuration. For example, if the UE can improve its communication with the base station by performing uplink gap processes, then the UE may request an uplink gap configuration from the base station. In some examples, the UE may request the uplink gap configuration without a query from the base station.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNB s), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include an uplink gap configuration module 198 configured to obtain, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the apparatus; detect a communication event corresponding to a first uplink slot of the one or more uplink slots; deactivate the first uplink slot of the one or more uplink slots in response to the communication event; and output, for transmission to the base station, a first signal via the first uplink slot in response to the communication event.

In certain aspects, the uplink gap configuration module 198 may be configured to obtain, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the apparatus; obtain, from the base station, scheduling for repeat transmissions of an uplink signal via a plurality of uplink slots within the first time window, the plurality of uplink slots including a first uplink slot of the one or more uplink slots activated as uplink gaps; and output the uplink signal for one or more of the repeat transmissions to the base station via the plurality of uplink slots not including the first uplink slot.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
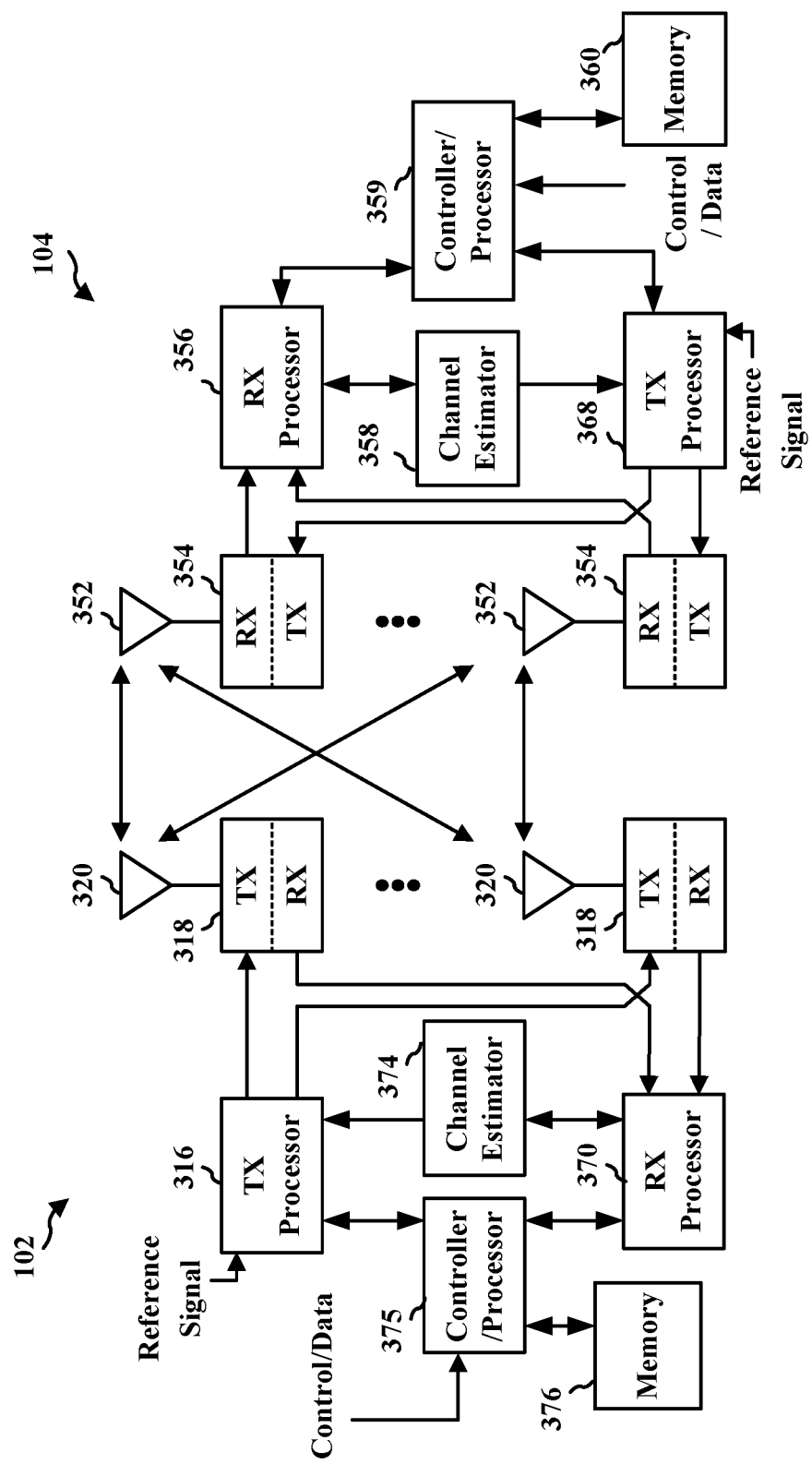
FIG. 3 is a diagram illustrating an example of a base station and user equipment (UE) in an access network.

FIG. 3 is a block diagram of a base station (e.g., base station 102 of FIG. 1) in communication with a UE (e.g., UE 104 of FIG. 1) in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the uplink gap configuration module 198 of FIG. 1.

Example Uplink Gap Configurations

As discussed, a base station may provide a UE with information for configuring an uplink gap at the UE. For example, the base station may provide the UE with one or more uplink gap patterns (ULGPs), as well as an uplink gap length (UGL) and uplink gap repetition periodicity (UGRP) corresponding to each of the one or more ULGPs. For instance, the UGL may indicate a number of consecutive static uplink slots configured as an uplink gap, per UGRP. For example, if the UE is communicating using a 120 kHz subcarrier spacing (SCS) (e.g., wherein the duration of each slot is ⅛ milliseconds (ms)), the UGRP is 20 ms, and the UGL is 1 ms, then the UE may use eight consecutive static uplink slots every 20 ms to perform an uplink gap process. Table 1 below is an example of four uplink gap configurations.

TABLE 1

| | UGL (ms) | UGRP (ms) | UGL/UGRP |
|---|---|---|---|
| ULGP#0 | 1.0 | 20 | 5% |
| ULGP#1 | 1.0 | 40 | 2.5% |
| ULGP#2 | 0.5 | 160 | ~0.31% |
| ULGP#3 | 0.125 | 5 | 2.5% |

Here, the UGL indicates the number of consecutive static uplink slots that can be configured as uplink gap slots within the time window indicated by the UGRP. The base station may configure and/or de-configure the UE with the uplink gap configurations via a radio resource control (RRC) configuration message. However, in some examples, the base station may configure and/or de-configure the UE with the uplink gap configurations, and/or activate an uplink gap configuration via a medium access control (MAC) command transmitted to the UE. In some examples, the base station may configure the UE for uplink gap via RRC messaging and may activate the uplink gap configuration via MAC command. For example, the base station may activate an uplink gap capability at a given UE by providing it with one or more uplink gap configurations.

In certain aspects, the UE can explicitly indicate to the base station a "need for uplink gap" and/or "no need for uplink gap." For example, the UE may transmit the indication to the base station via uplink control (e.g., physical uplink control channel (PUCCH), uplink control information (UCI)) or uplink shared channel (e.g., physical uplink shared channel (PUSCH)). In some examples, the "need for uplink gap" may be used by the UE as a request for uplink gap configuration. The UE may perform uplink gap processes once the uplink gap is configured and activated at the UE. The uplink gap processes may include BPS sensing and any other suitable self-calibration and/or self-monitoring process during the uplink gap slot. That is, the UE may refrain from using a downlink slot or special slot as an uplink gap slot.

Figure 4:
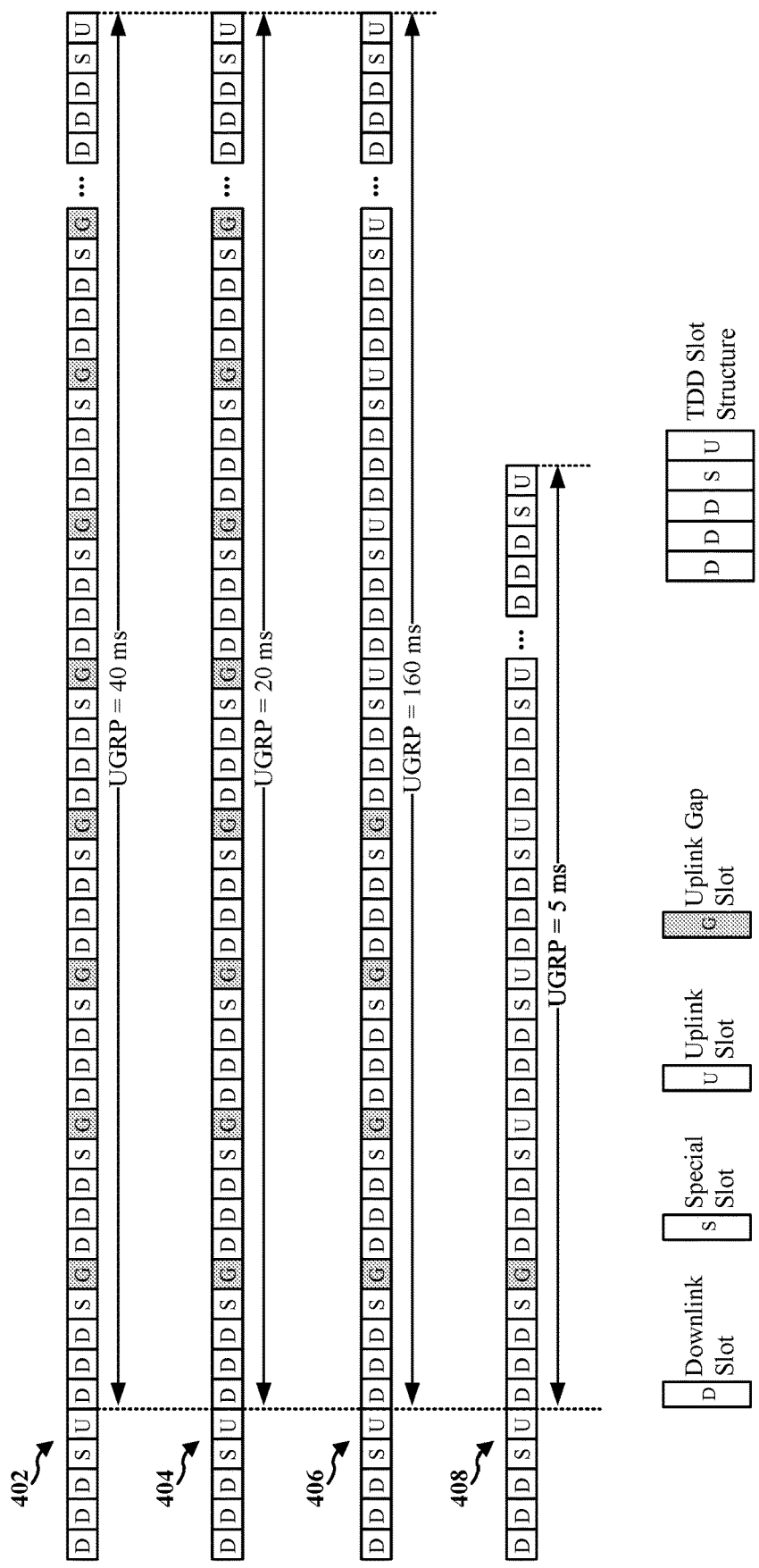
FIG. 4 is a block diagram illustrating example uplink gap slots for each of the four corresponding to uplink gap patterns (UGLPs).

FIG. 4 is a block diagram illustrating example uplink gap slots for each of the four UGLPs of Table 1. Here, each of the four TDD slot structures illustrated use a DDDSU (downlink-downlink-downlink-special-uplink) TDD slot structure configuration at 120 KHz SCS. Shaded slots labeled as "G" correspond to slots used for UL gap according to each ULGP. Slots labeled "D" are downlink slots, "U" are uplink slots, and "S" are special slots.

A first TDD frame structure 402 is illustrated using ULGP #0 of Table 1 above. Here, because the length of one slot in the 120 kHz numerology is ⅛ ms, and the UGL is 1 ms, the total number of consecutive uplink slots that can be used as uplink gap slots is 8 (0.125 ms×8=1 ms). Thus, the UE may use a total of 8 uplink slots as uplink gap slots every periodic 40 ms time window (e.g., UGRP=40 ms for ULGP #0).

A second TDD frame structure 404 is illustrated using ULGP #1 of Table 1 above. Here, similar to ULGP #0, the UGL is 1 ms, meaning that the total number of consecutive uplink slots that can be used as uplink gap slots is 8. Thus, the UE may use a total of 8 uplink slots as uplink gap slots every periodic 20 ms time window (e.g., UGRP=20 ms for ULGP #1).

A third TDD frame structure 406 is illustrated using ULGP #2 of Table 1 above. Here, because the UGL is 0.5 ms, the total number of consecutive uplink slots that can be used as uplink gap slots is 4 (0.125 ms×4=1 ms). Thus, the UE may use a total of 4 uplink slots as uplink gap slots every periodic 160 ms time window (e.g., UGRP=160 ms for ULGP #2).

A fourth TDD frame structure 408 is illustrated using ULGP #3 of Table 1 above. Here, because the UGL is 0.125 ms, the total number of consecutive uplink slots that can be used as uplink gap slots is 1. That is, the UE may use 1 uplink slot as an uplink gap slots every periodic 5 ms time window (e.g., UGRP=5 ms for ULGP #3).

It should be noted that the values provided in Table 1 are examples, and any other suitable values may also be used. For example, the UE may use any number of consecutive UL gap slots for a UGRP so long as the aggregated duration of the number of consecutive uplink gap slots is equal to or less than the UGL, and the number of consecutive uplink gap slots fit within the periodic time window (e.g., UGRP). Moreover, it should be noted that the numerology (e.g., 120 kHz) and TDD slot structure of FIG. 4 may be changed to any suitable numerology or SCS (e.g., 120 kHz, 60 kHz, etc.), as well as any suitable TDD slot structure.

Figure 5:
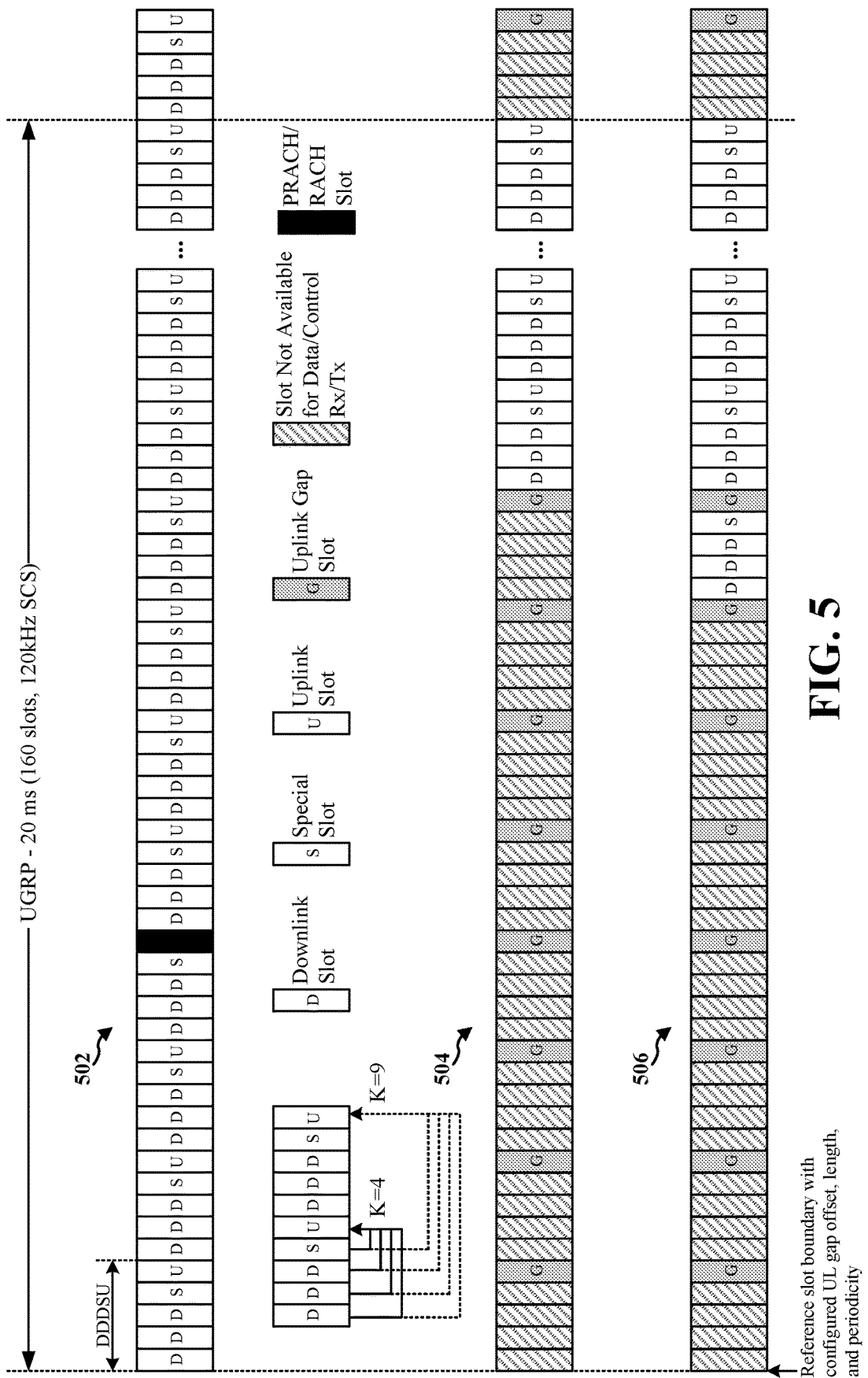
FIG. 5 is a block diagram illustrating example time-division duplex (TDD) slot structures and corresponding communication impacts caused by uplink gap slots.

FIG. 5 is a block diagram illustrating example TDD slot structures and corresponding communication impacts caused by uplink gap slots. Here, as in FIG. 4, the TDD slot structures illustrated use the DDDSU (downlink-downlink-downlink-special-uplink) TDD slot structure configuration at 120 KHz SCS. Shaded slots labeled as "G" correspond to the slots used for UL gap according to each ULGP. Slots labeled "D" are downlink slots, "U" are uplink slots, and "S" are special slots. Slots not available for downlink communication (e.g., data and/or control signals) are illustrated with a diagonal cross-hatching pattern. A slot shaded black is included to illustrate an example RACH slot A first TDD frame structure 502 is provided as a reference structure. Here, the first TDD frame structure 502 uses the DDDSU TDD configuration, and begins at a reference slot boundary. A second TDD frame structure 504 is provided illustrating an example impact of ULGP #0 with K1 up to 4 on communications over the reference structure. Note that the RACH slot is aligned with the uplink slots configured as uplink gaps in both of the first TDD frame structure 502 and the second TDD frame structure 504. A third TDD frame structure 506 is provided illustrating an example impact of ULGP #0 with K1 up to 9 on communications over the reference structure. Here, K1 is an offset between a downlink slot where data is scheduled (e.g., on PDSCH) and an uplink slot where the ACK/NACK feedback for the scheduled downlink data should be sent. For example, if K1=4, then an ACK/NACK should be sent in an uplink slot for corresponding data that was scheduled 4 or less slots prior to the uplink slot. If K1=9, then an ACK/NACK should be sent in an uplink slot for corresponding data that was scheduled 9 or less slots prior to the uplink slot.

As noted, ULGP #0 is used for the second TDD frame structure 504. As such, the UGL is 1 ms, and the UGRP is 20 ms. Because of the 120 kHz SCS used in this example, the UGL translates to 8 uplink slots that can be used as uplink gap slots, and the UGRP translates to a 160-slot periodic time window. Because K1=4 for the second TDD frame structure 504, the UE may be required to transmit an ACK/NACK for a downlink transmission no more than four slots following the downlink slot of the downlink transmission.

However, because uplink slots are used as uplink gap slots in a consecutive manner, the first eight uplink slots within the 160-slot UGRP are used as uplink gap slots. As such, the UE may not be able to transmit an ACK/NACK to any downlink data transmitted by the base station to the UE over the downlink slots that occur prior to the uplink gap slots. Although the UE may still receive and decode the downlink transmissions, the uplink gap slots may prevent the UE from transmitting any ACK/NACK in response. Thus, by committing the first eight uplink slots of the UGRP to uplink gap slots, the UE has effectively rendered the first twenty-four downlink slots unavailable for transmission of data. As a result, the beginning of each UGRP may be unavailable for downlink and uplink transmissions, which can negatively affect data communication and throughput between the UE and base station.

Similarly, the third TDD frame structure 506 uses ULGP #0, an SCS of 120 kHz, and the same TDD configuration as the reference structure. However, for the third TDD frame structure 506, K1=9. As such, it should be noted that the third TDD frame structure 506 includes three more available downlink slots than the second TDD frame structure 504 due to the higher K1 offset value.

The second TDD frame structure 504 and the third TDD frame structure 506 illustrate the negative impact on data communication and throughput between the UE and base station due to with uplink gap slots. Specifically, by using a consecutive scheduling of uplink gap slots, large durations of time are formed during which the UE cannot respond to downlink communications. As discussed, if a timing advance (TA) becomes invalid and uplink RACH resources overlap with an uplink gap slot, then the UE may be prevented from obtaining a valid TA. Similar problems may occur regarding radio link failure (RLF), beam failure, configured grant (CG) uplink scheduling, and PUSCH repetition scheduling.

Thus, techniques for reducing the number of unavailable slots for downlink communications would reduce the negative impact caused by scheduling consecutive uplink gap slots.

Examples of Uplink Resource Availability in Uplink Gap Distributions

In certain aspects, the UE may activate uplink slots as uplink gap slots within an ULGP based on an TDD uplink/downlink slot structure configuration and an activated uplink gap pattern (e.g., ULGP). In some examples, the UE may uniformly distribute the uplink gap slots to uplink slots within the ULGP to eliminate large durations of time that would otherwise result from activating uplink gaps for consecutive uplink slots (e.g., as illustrated in FIG. 5).

Figure 6:
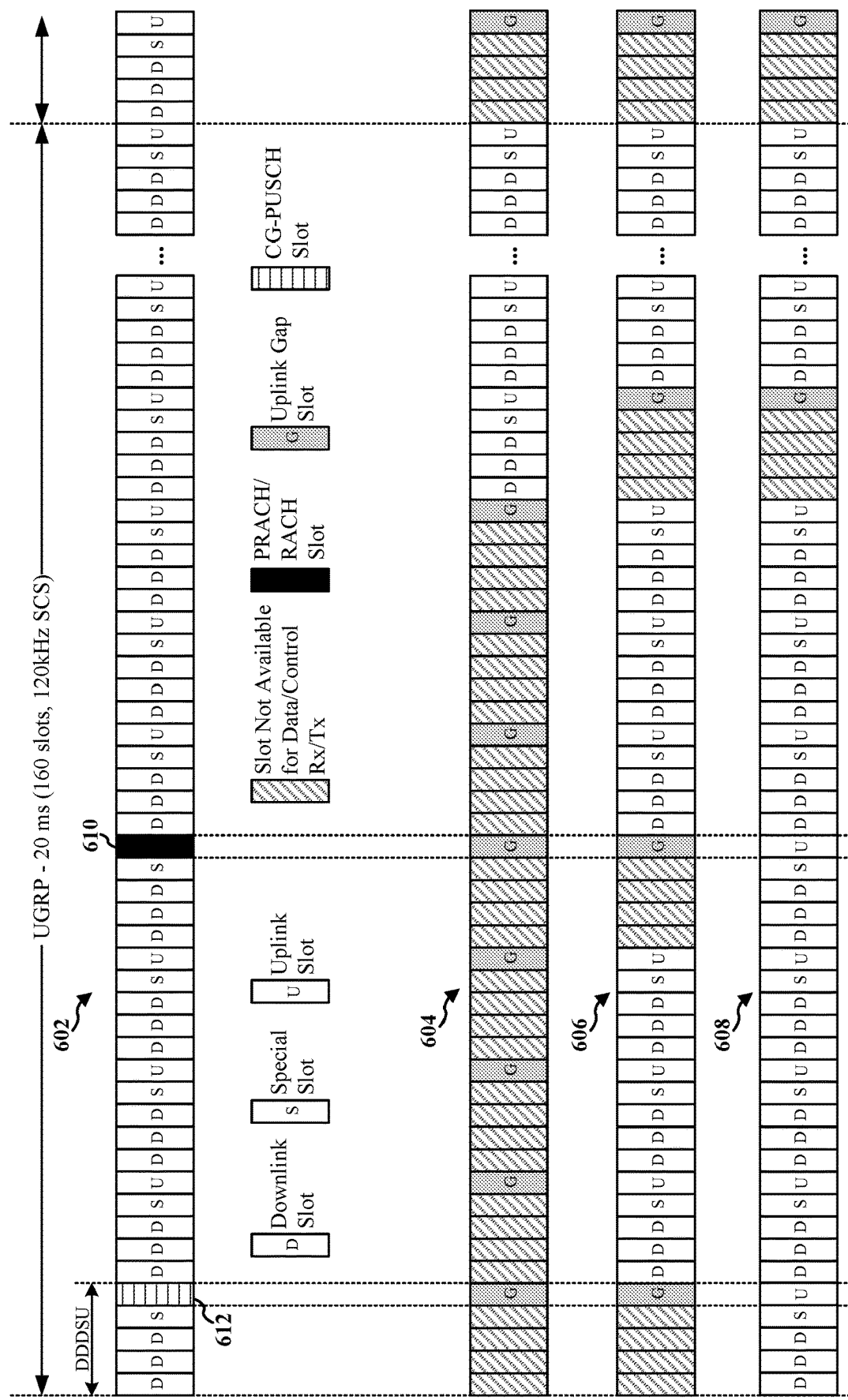
FIG. 6 is a block diagram illustrating example uplink gap distributions in an example TDD slot structure configuration.

FIG. 6 is a block diagram illustrating example uplink gap distributions in an example TDD slot structure configuration. A first TDD frame structure 602 provides a reference frame structure defined by a TDD slot structure of DDDSU and a 120 kHz SCS. The following frame structures of FIG. 6 may use the same TDD configuration and SCS. Similar to the example of FIG. 5, the UGRP is a 20 ms duration for ULGP #0, and 8 uplink gap slots (e.g., 1 ms UGL) are provided for the UGRP.

A second TDD frame structure 604 and a third TDD frame structure 606 are provided illustrating a comparison of different uplink gap distributions using ULGP #0 with a K1 value of up to 4 on communications over the reference frame structure. Here, both the second TDD frame structure 604 and a third TDD frame structure 606 are configured with K1=4. Thus, the second TDD frame structure 604 is similar to the second TDD frame structure 504 of FIG. 5. That is, the uplink gap slots are mapped to eight consecutive uplink slots at the start of the UGRP, and the first twenty-four downlink slots are rendered unavailable.

However, as illustrated in the third TDD frame structure 606, instead of mapping uplink gaps to the first 8 consecutive uplink slots, the UE may distribute the uplink gaps within the full duration of the 20 ms UGRP. For example, as illustrated in the third TDD frame structure 606, the first uplink slot may be used as an uplink gap slot, and every fourth uplink slot thereafter may be used as an uplink gap slot. Accordingly, the UE may still map 8 uplink gaps to uplink slots within the UGRP, but in this example, the 8 uplink gaps are uniformly distributed throughout the UGRP (e.g., even distribution pattern of uplink gap slots).

Because of the low K1 value, certain downlink slots may still be unavailable for communication between the UE and the base station. However, by distributing the uplink gap slots, the UE may avoid the relatively long durations of unavailable slots shown in the second TDD frame structure 604. As discussed, the relatively long durations of unavailable slots can prevent UE from responding to timers or receiving downlink data for a relatively long period of time. Moreover, such a long duration may prevent a UE from performing according to quality of service (QoS) requirements (e.g., latency, priority, reliability, etc.) associated with the communication.

As discussed, a UE may not expect to be scheduled with an uplink transmission during an uplink slot that is configured as an uplink gap slot. Moreover, because the uplink slot configured as an uplink gap is a static slot (e.g., an uplink slot corresponding to a TDD uplink/downlink pattern), the uplink gap slot applies the same timing advance (TA) as other slots of the TDD pattern. Accordingly, once a TA becomes invalid (e.g., due to timeAlignmentTimer expiration) the UE will no longer be able to communicate with the base station. As such, expiration of the TA timer or an approaching expiration of the TA timer an may trigger the UE to initiate a RACH procedure with the base station so that the TA can be updated and a new TA timer established. Alternatively, if the TA timer is nearing expiration, the base station may transmit a RACH command to the UE, instructing the UE to initiate the RACH procedure. These processes allow the UE to maintain a radio link with the base station.

However, if the UE has configured one or more uplink slots as uplink gap slots within a UGRP time window, then there is a likelihood that the TA timer will expire during an uplink gap slot or a downlink slot that has been blanked due to the uplink gap slot. As such, the UE may not be capable of transmitting an uplink RACH message over the uplink gap slot in response to the timer expiring or in response to a downlink RACH command. As illustrated in FIG. 6, a RACH slot 610 is shown indicating a time for the UE to initiate a RACH procedure or to otherwise communicate RACH uplink signaling (e.g., Msg2/4 or MsgA/B) to establish a valid TA with the base station. In this example, both of the second TDD frame structure 604 and the third TDD frame structure 606 have been configured by the UE to have an uplink slot configured as an uplink gap at the RACH uplink slot 610.

Thus, in certain aspects, when a TA becomes invalid or when a TA timer approaches expiration, and when uplink resources for a ransom access procedure overlap with an uplink gap slot, then the UE may temporarily deactivate one or more uplink gap slots (e.g., reconfigure the uplink gap slot to operate as an uplink slot for communication) so that the UE can be scheduled to transmit uplink RACH signaling over the slot. For example, as shown in a fourth TDD frame structure 608, the UE may deactivate or reconfigure the uplink slot corresponding to the RACH slot 610 so that it is no longer an uplink gap. In this example, the fourth TDD frame structure 608 uses the same ULGP #0 and K1 value used by the first, second, and third TDD frame structures (602/604/606), and the same uniform distribution of uplink gaps within the UGRP as the third TDD frame structure 606.

In the example illustrated, the UE may deactivate only the uplink gap slots within a UGRP that will be used by the UE to perform the random access procedure and obtain a valid TA, while keeping active any remaining uplink gap slots that are not affected by the random access procedure. Thus, in the illustrated example, the UE only deactivates the uplink gap slot that coincides with the RACH slot 610, leaving the remaining uplink gap slots active as uplink gaps.

In another example, the UE may temporarily deactivate all uplink gap slots in one or more UGRPs so that the UE is able to transmit all RACH uplink communications related to a TA update. In this example, the UE may reactivate any remaining uplink slots within the one or more UGRPs to uplink gap slots after the UE obtains a valid TA and the valid TA is applied at the UE.

Accordingly, in either example, the UE may deactivate uplink gap slots in order to receive and acknowledge random access procedure commands (e.g., transmitted over physical downlink control channel (PDCCH)) from the base station, and/or to transmit uplink signaling (e.g., RACH signaling) over uplink slots that were previously configured as uplink gap slots. In this way, the UE can dynamically reconfigure uplink gaps in order to maintain an active radio link with the base station.

In certain aspects, a UE may detect radio link failure (RLF) of a radio link used for communication with a base station, and/or detect beam failure of a beam used by the UE for communication with the base station. In some examples, the UE may determine RLF based downlink signal quality (e.g., reference signal received power (RSRP), etc) Similarly, the UE may determine beam failure if the UE detects that downlink signal quality is below a threshold, e.g., 10% block error rate (BLER) of a downlink channel. In case of either an RLF or a beam failure, the UE may initiate a ransom access procedure to reestablish the radio link, and/or for beam recovery.

However, if the UE has configured one or more uplink slots as uplink gap slots within a UGRP time window, then there is a likelihood that an uplink gap slot or a downlink slot that has been blanked due to the uplink gap slot will interrupt a radio link reestablishment and/or beam recovery process. For example, an uplink gap slot may prevent the UE from transmitting an uplink RACH message in response to the RLF or beam failure.

Similar to the process for establishing a valid TA, the UE may deactivate an uplink gap slot to enable the UE to be scheduled for uplink transmission over the corresponding uplink slot. For example, the UE may deactivate one or more uplink gaps for uplink slots that the UE expects to use for uplink RACH communications for radio link and/or beam failure recovery. Referring back to FIG. 6, the uplink RACH slot 610 coincides with an uplink slot configured as an uplink gap in both of the second TDD frame structure 604 and the third TDD frame structure 606. Thus, the UE may deactivate/reconfigure the RACH slot 610 of the fourth TDD frame structure 608 to allow the UE to transmit uplink RACH communications to the base station. In another example, the UE may temporarily deactivate all uplink gaps during radio link and/or beam failure recovery, then reactivate any uplink gap slots for uplink slots that were unused for the radio link and/or beam failure recovery process.

Accordingly, in either example, the UE may deactivate uplink gap slots in order to receive and acknowledge RACH commands (e.g., transmitted over physical downlink control channel (PDCCH)) from the base station, and/or to transmit uplink signaling (e.g., RACH signaling) over uplink slots that were previously configured as uplink gap slots. In this way, the UE can dynamically reconfigure uplink gaps in order to resolve RLF and beam failure.

In certain aspects, a UE may receive, from a base station, downlink control information for a configured grant physical uplink shared channel (CG-PUSCH). For example, the CG configuration may be for a type 1 CG-PUSCH transmission or a type 2 CG-PUSCH transmission. For the type 1, the base station may configure, via radio resource control (RRC) messaging, a time domain resource allocation, a periodicity of resources, an offset, a start symbol, a number of repetitions, and a length of the PUSCH. For the type 2, the base station may configure the UE with only the periodicity and the number of repetitions via RRC messaging, whereas the other parameters may be configured via downlink control information (DCI). Thus, the base station may pre-configure the UE with CG resources so that the UE may transmit uplink data using the CG resources without transmitting a scheduling request (SR) and receiving an UL grant as dynamic grant (DG). CG-PUSCH provides the UE with the ability to rapidly provide uplink communications (e.g., UCI, ACK, etc.), thereby improving throughput and reducing latency in communications.

However, if the UE has configured one or more uplink slots as uplink gap slots within a UGRP time window, then there is a likelihood that an uplink slot that has been scheduled for CG will be configured as an uplink gap slot. In this example, the configuration as an uplink gap slot will interrupt uplink communications because the UE will not be able to communicate over the uplink slot configured as an uplink gap.

Thus, in certain aspects, the UE may deactivate/reconfigure an uplink gap slot to enable the UE to transmit over the corresponding uplink slot when that slot is scheduled by CG. For example, as illustrated in FIG. 6, a CG-PUSCH slot 612 is scheduled such that it coincides with an initial uplink slot in the UGRP. Here, the uplink gap distribution of either second TDD frame structure 604 or the third TDD frame structure 606 creates a conflict because the UE should transmit over the CG-PUSCH slot 612, but it cannot due to that slot being configured as an uplink gap. Thus, the UE may deactivate/reconfigure the CG-PUSCH slot 612 of the fourth TDD frame structure 608 to allow the UE to transmit uplink communications to the base station according to the CG schedule. In this way, the UE can dynamically reconfigure uplink gaps based on CG-PUSCH scheduling/configuration.

Figure 7:
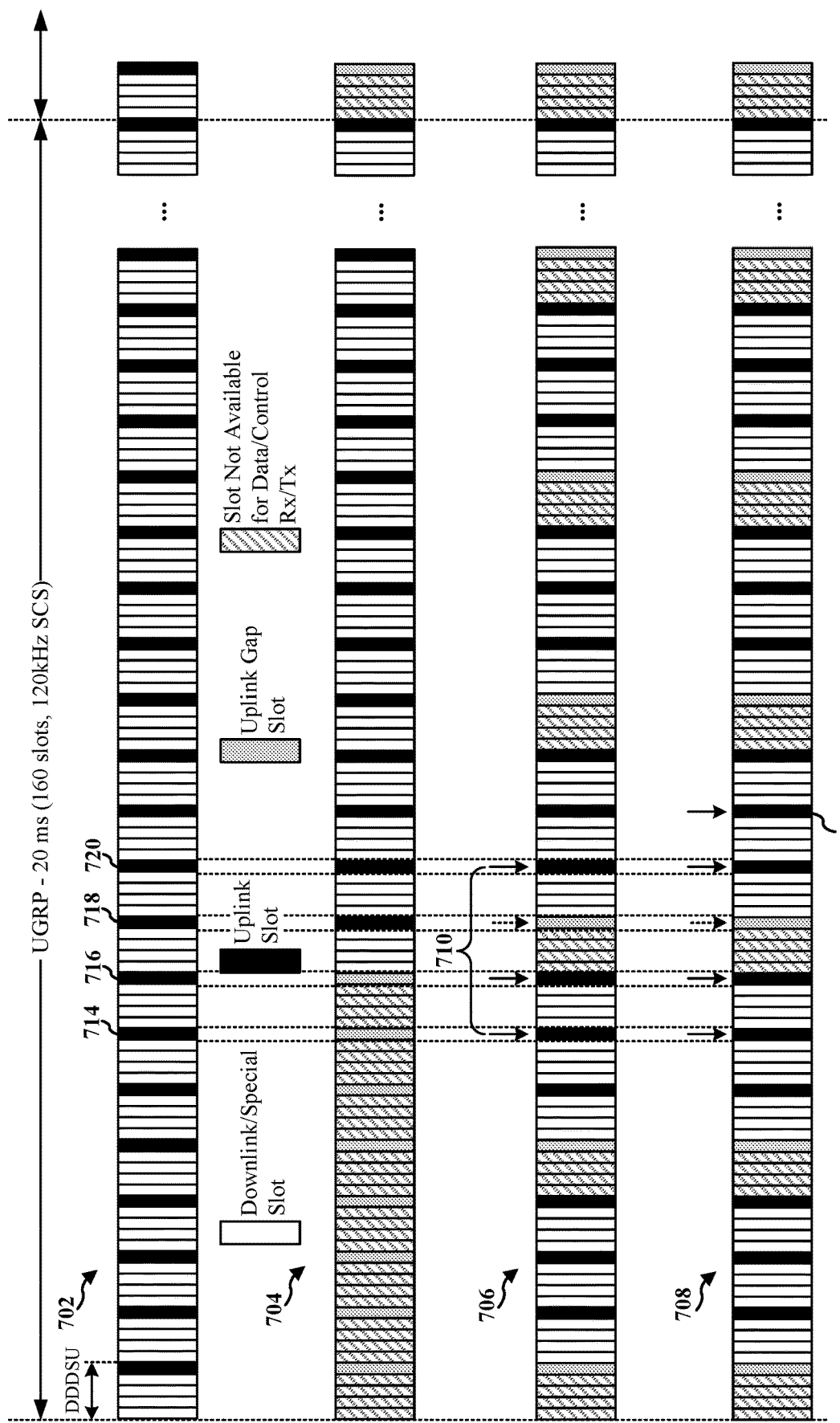
FIG. 7 is a block diagram illustrating example uplink gap distributions in an example TDD slot structure configuration.

FIG. 7 is a block diagram illustrating example uplink gap distributions in an example TDD slot structure configuration. A first TDD frame structure 702 provides a reference frame structure defined by a TDD slot structure of DDDSU and a 120 kHz SCS. The following frame structures of FIG. 7 may use the same TDD configuration and SCS. Similar to the examples of FIGS. 5 and 6, the UGRP is a 20 ms duration for ULGP #0, and 8 uplink gap slots (e.g., 1 ms UGL) are provided for the UGRP.

A second TDD frame structure 704, a third TDD frame structure 706, and a fourth TDD structure 708 illustrate a comparison of different uplink gap distributions using ULGP #0 with a K1 value of up to 4 on communications over the reference frame structure. Here, the three TDD frame structures 704/706/708 are configured with K1=4.

However, as illustrated in the third TDD frame structure 706 and the fourth TDD frame structure 708, instead of mapping uplink gaps to the first 8 consecutive uplink slots, the UE may uniformly/evenly distribute the uplink gaps within the full duration of the 20 ms UGRP. For example, as illustrated in the third and fourth TDD frame structures 706/708, the first uplink slot may be used as an uplink gap slot, and every fourth uplink slot thereafter may be used as an uplink gap slot. Accordingly, the UE may still map 8 uplink gaps to uplink slots within the UGRP, but in this example, the 8 uplink gaps are uniformly distributed throughout the UGRP (e.g., even distribution pattern of uplink gap slots).

In certain aspects, a base station may configure/schedule a UE for uplink transmissions over multiple consecutive uplink slots (e.g., PUSCH repetition over multiple uplink slots). For example, if conditions warrant (e.g., a radio link quality between the UE and the base station has dropped below a threshold), the base station may configure the UE to repeat an uplink signal to the base station over multiple uplink slots. In some examples, the base station may schedule the repeat uplink transmissions by indicating a particular transport block (TB) (e.g., repetition TB 710) within which the UE may transmit repeated uplink signals. That is, the base station may consider any uplink slots within the TB as valid uplink slots for uplink transmission, even if the UE has configured one of the uplink slots as an uplink gap. As illustrated, the UE may be configured with a repetition TB 710 that includes four uplink slots (a first uplink slot 714, a second uplink slot 716, a third uplink slot 718, and a fourth uplink slot 720). Thus, in this example, the base station may expect the UE to transmit an uplink signal four times within the repetition TB 710. However, in this example, the UE has configured the third uplink slot 718 of the repetition TB 710 as an uplink gap slot.

In such a case, the UE may perform one of two options. A first option is illustrated by the third TDD frame structure 706. In this example, the UE may determine to puncture the repetition TB 710 by maintaining the uplink gap configuration of the third uplink slot 718 and not transmitting any uplink signaling over it. That is, the UE may transmit repeated signaling over the first, second, and third uplink slots 714/716/720, but omit any uplink transmission via the third uplink slot 718.

A second option is illustrated by the fourth TDD frame structure 708. In this example, the UE may puncture the PUSCH repetition by not transmitting over the third uplink slot, and rate matching based on one or more of the size and mapping of the repetition TB 710. For example, the UE may determine to not transmit uplink signaling over the third uplink slot 718, and instead determine to transmit the uplink signaling over a fifth slot 722 adjacent to the repetition TB 710. Here, because the UE skipped one uplink transmission within the repetition TB 710, the UE may rate match by transmitting one uplink transmission in the fifth uplink slot 722. The rate matched uplink slot may include an uplink slot that occurs immediately prior or after the repetition TB 710 (e.g., is consecutive to at least one of the uplink slots in the repetition TB 710).

In either option, the UE does not deactivate the uplink gap, but rather skips the uplink transmission scheduled with the uplink gap or reschedules the uplink transmission for another consecutive uplink slot.

Figure 8:
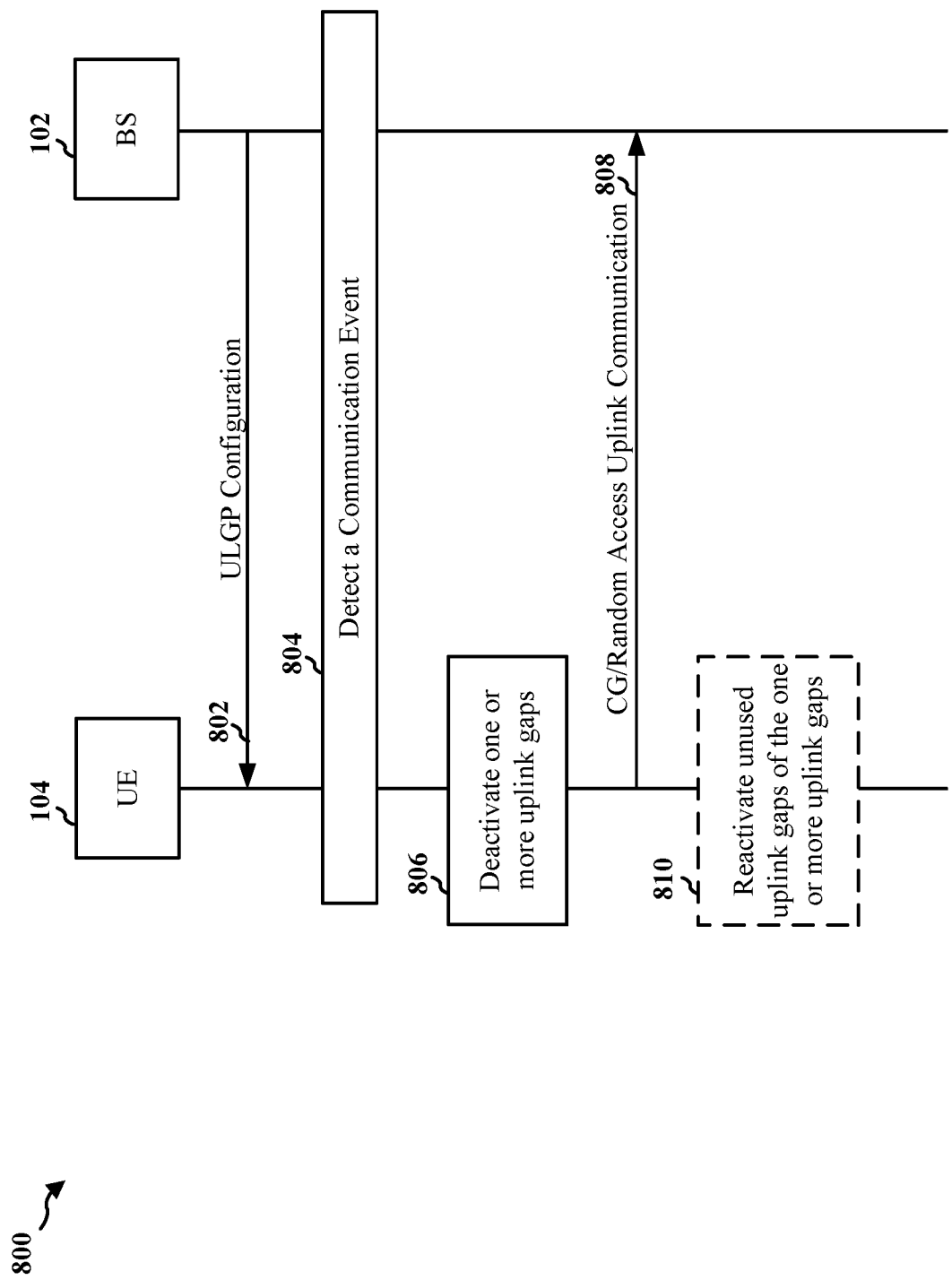
FIG. 8 is a call-flow diagram illustrating example communications between a UE and a base station for determining uplink resources.

FIG. 8 is a call-flow diagram illustrating example communications 800 between a UE (e.g., UE 104 of FIG. 1) and a base station (e.g., BS 102 of FIG. 1). At a first step 802, the UE 104 may obtain, from the base station 102, a ULGP configuration indicating at least a first ULGP associated with a first UGL and a first UGRP. The first ULGP may indicate a distribution of one or more uplink slots that the UE may activate as uplink gaps within the first UGRP. However, it should be noted that the UE may distribute the uplink gaps within the first UGRP in any suitable manner, including a uniform distribution of uplink gaps throughout the first UGRP so that the uplink gaps are not mapped to consecutive uplink slots.

At a second step 804, one or more of the UE 104 or the base station 102 may detect a communication event. The communication event may include an expiring TA timer. For example, the UE 104 may determine that the TA timer will be expiring, and that the UE 104 should proceed to perform a random access procedure with the base station 102 in order to obtain a valid TA. The communication event may also include a downlink transmission from the base station in response to the expiring TA timer, wherein the downlink transmission includes a random access command configured to instruct the UE 104 to initiate the random access procedure with the base station 102. In some examples, the communication event may include the UE 104 detecting a radio link failure (RLF) of a radio link between the UE 104 and the base station 102. In another example, the communication event may include the UE 104 detecting a beam failure of a beam used by the UE 104 for communication with the base station 102. In yet another example, the communication event may include a determination, by the UE 104, that an uplink transmission is scheduled at a first uplink slot by a configured grant (CG), and that the first uplink slot has been configured/activated as an uplink gap. It should be noted that a communication event may include any suitable event that may affect communication between the UE 104 and the base station 102.

At a third step 806, the UE 104 may deactivate one or more uplink gaps in response to the communication event. For instance, the UE 104 may deactivate the uplink gap of the first uplink slot if the UE determines that the communication event corresponds to the first uplink slot. For example, if an uplink RACH resource coincides with the first uplink slot, then the UE 104 may deactivate the uplink gap configuration of the first uplink slot so that the UE 104 can transmit an uplink RACH transmission. Here, the an uplink RACH resource may correspond to the communication event because the RACH resource may be used to perform a random access process for obtaining a valid TA, resolving the RLF, and/or resolving the beam failure. In another example, if a CG scheduled uplink resource coincides with the first uplink slot, then the UE 104 may deactivate the uplink gap configuration of the first uplink slot so that the UE 104 can transmit uplink signaling as scheduled.

In some examples, the UE 104 may deactivate uplink gaps at a plurality of uplink slots. For instance, the UE 104 may deactivate all uplink gaps for one or more UGRPs in response to the communication event. This is because the UE 104 may transmit multiple uplink transmissions in response to the communication event. For example, the UE 104 may need to transmit multiple uplink signals during a random access procedure, and thus, the UE 104 may deactivate uplink gaps for multiple uplink slots to transmit the uplink signals.

At a fourth step 808, the UE 104 may transmit an uplink communication over the first uplink slot, wherein the uplink communication includes one or more of the CG scheduled uplink transmission or the RACH uplink transmission.

Optionally, at a fifth step 810, the UE 104 may reactivate uplink gaps that were deactivated at the third step 806 but were not used for transmission of RACH signals or CG scheduled signals.

Figure 9:
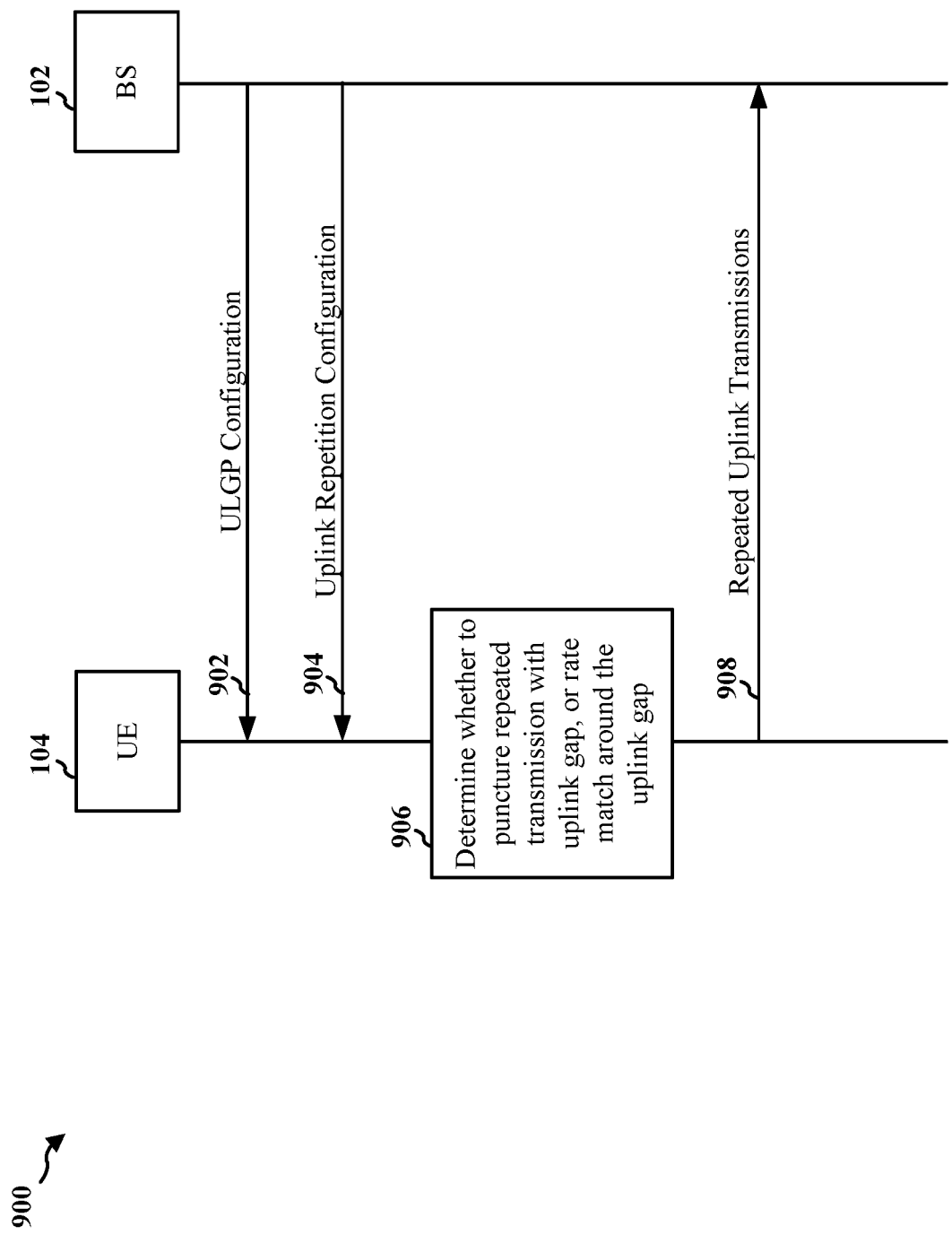
FIG. 9 is a call-flow diagram illustrating example communications between a UE and a base station for determining uplink resources.

FIG. 9 is a call-flow diagram illustrating example communications 900 between a UE (e.g., UE 104 of FIG. 1) and a base station (e.g., BS 102 of FIG. 1). At a first step 902, the UE 104 may obtain, from the base station 102, a ULGP configuration indicating at least a first ULGP associated with a first UGL and a first UGRP. The first ULGP may indicate a distribution of one or more uplink slots that the UE 104 may activate as uplink gaps within the first UGRP. However, it should be noted that the UE 104 may distribute the uplink gaps within the first UGRP in any suitable manner, including a uniform distribution of uplink gaps throughout the first UGRP so that the uplink gaps are not mapped to consecutive uplink slots.

At a second step 904, the base station 102 may configure the UE 104 with an uplink repetition configuration. For example, the base station 102 may schedule the UE 104 to transmit repeated uplink transmissions via a plurality of uplink slots. The base station 102 may schedule the repeat uplink transmissions by indicating a particular TB within which the UE may transmit repeated uplink signals.

At a third step 906, the UE 104 may determine whether any of the scheduled repeat uplink transmissions coincide with an uplink slot configured as an uplink gap. If one or more of the repeat uplink transmissions correspond to uplink slots configured as an uplink gap, then the UE 104 may determine whether to puncture the scheduled repeat uplink transmissions (e.g., first option), or puncture and rater match the scheduled repeat uplink transmissions (e.g., second option).

At a fourth step 908, the UE 104 may transmit the repeat uplink transmissions according to the determined option.

Figure 10:
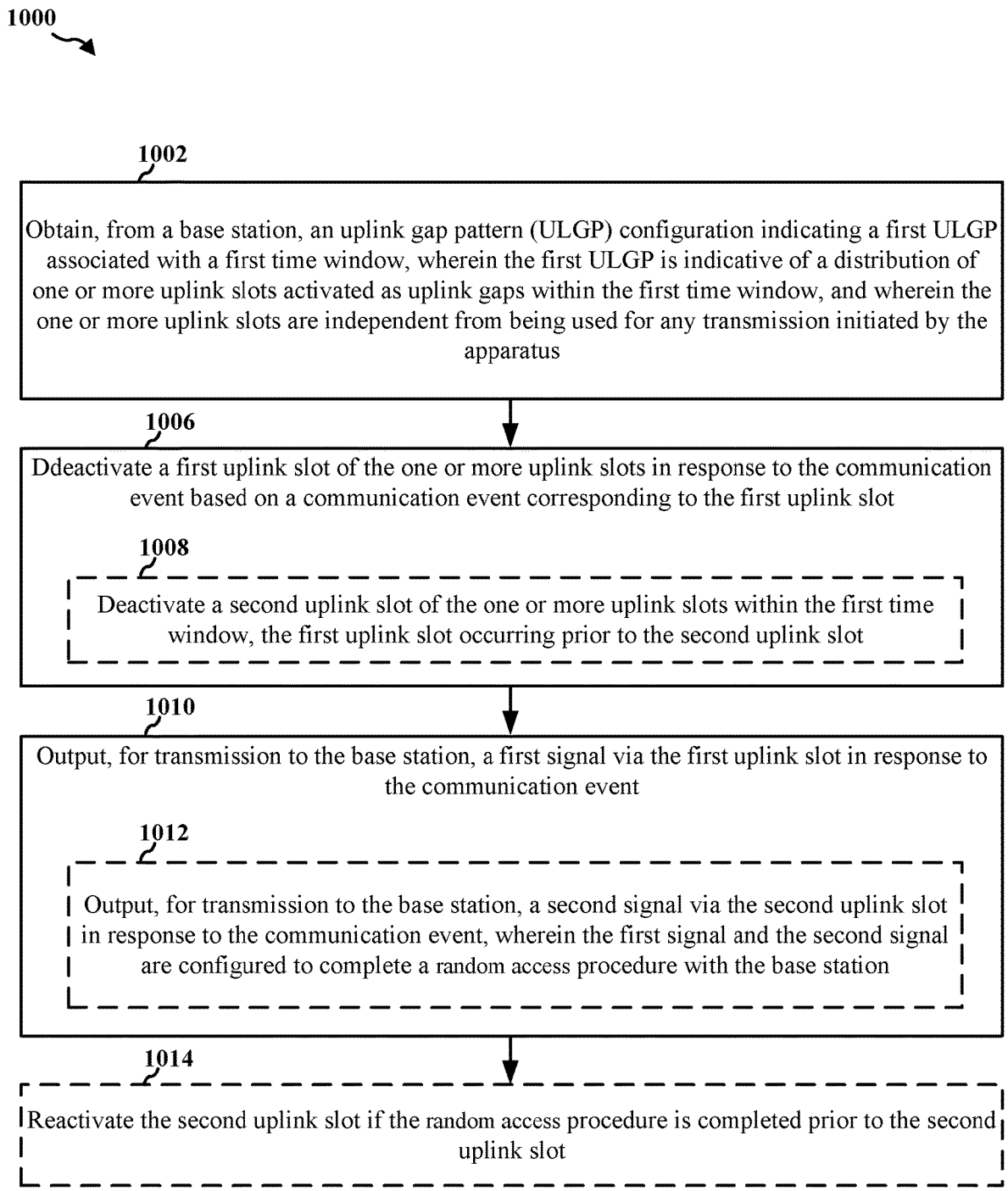
FIG. 10 is a flowchart of a method of wireless communication performed by a UE.

FIG. 10 is a flowchart 1000 of a method of wireless communication. The method may be performed by a UE (e.g., the UE 104; the apparatus 1102).

At a first step 1002, the UE may obtain, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the apparatus. For example, the first step 1002 may be performed by an obtaining component 1140. Here, the UE receive or obtain uplink gap configuration information from the base station. For example, the base station may provide the UE with one or more ULGPs, as well as a UGL and a UGRP corresponding to each of the one or more ULGPs. Each of the one or more ULGPs may include a default distribution of uplink gaps within a corresponding UGRP; however, the UE may uniformly distribute the uplink gaps within the UGRP.

At a third step 1006, the UE may deactivate the first uplink slot of the one or more uplink slots in response to the communication event. For example, the third step 1006 may be performed by a deactivating component 1142. Here, if the UE detects a communication event, determines that communication of an uplink signal over a first uplink slot may address the communication event, and determines that the first uplink slot is configured as an uplink gap, then the UE may determine to deactivate the uplink gap configuration of the first uplink slot so that the UE may transmit the uplink signaling over the first uplink slot to address the communication event, as illustrated in FIGS. 6 and 8.

Here, the communication event may include at least one of an expiration of a time alignment (TA) timer, a downlink transmission from the base station in response to an expiration of the TA timer, a failure of a radio link between the apparatus and the base station, a failure of a beam used by the apparatus for communication with the base station, an uplink transmission scheduled at the first uplink slot by a configured grant, and wherein the first signal via the first uplink slot comprises the uplink transmission, and/or any other suitable communication event that may trigger the UE to deactivate an uplink gap slot so that the UE may address the communication event by transmitting over that uplink slot.

At a fourth step 1008, the UE may optionally deactivate a second uplink slot of the one or more uplink slots within the first time window, the first uplink slot occurring prior to the second uplink slot. For example, the fourth step 1008 may be performed by a deactivating component 1142. Here, the UE may deactivate the uplink gap of additional uplink slots if the UE expects that multiple uplink communications may be necessary to address the communication event, and those multiple uplink communications would otherwise be prevented by the uplink gap configuration. In another example, the UE may deactivate all the remaining uplink gap configurations of a UGRP to ensure that there are no uplink gaps that can prevent the uplink communications for addressing the communication event.

At a fifth step 1010, the UE may output, for transmission to the base station, a first signal via the first uplink slot in response to the communication event. For example, the fifth step 1010 may be performed by an outputting component 1144. Here, the UE may transmit an uplink communication to address the communication event, wherein the transmission is over an uplink slot that was previously activated for uplink gap but has since been deactivated by the UE in order to output the first signal.

At a sixth step 1012, the UE may optionally output, for transmission to the base station, a second signal via the second uplink slot in response to the communication event, wherein the first signal and the second signal are configured to complete a random access procedure (e.g., PRACH) with the base station. For example, the sixth step 1012 may be performed by the outputting component 1144. Here, if the UE deactivated an uplink gap configuration for multiple uplink slots in order to transmit uplink communications that address the communication event, then the UE may transmit multiple uplink communications over the uplink slots that were previously configured as uplink gap slots but were deactivated.

At a seventh step 1014, the UE may optionally reactivate the second uplink slot if the random access procedure is completed prior to the second uplink slot. For example, the seventh step 1014 may be performed by the reactivating component 1146. Here, if multiple uplink slots were deactivated as uplink gaps, but not all of the multiple slots were used for uplink communications to address the communication event, then the UE may reconfigure one or more of the multiple uplink slots if they are still in the future.

In certain aspects, the communication event comprises an expiration of a time alignment (TA) timer.

In certain aspects, the first signal is configured to initiate a random access procedure (e.g., PRACH, etc.) with the base station.

In certain aspects, the communication event comprises a downlink transmission from the base station in response to an expiration of a time alignment (TA) timer.

In certain aspects, the downlink transmission comprises a command configured to instruct the apparatus to initiate a random access procedure with the base station.

In certain aspects, the communication event comprises a failure of a radio link between the apparatus and the base station.

In certain aspects, the communication event comprises a failure of a beam used by the apparatus for communication with the base station.

In certain aspects, the communication event comprises an uplink transmission scheduled at the first uplink slot by a configured grant, and wherein the first signal via the first uplink slot comprises the uplink transmission.

Figure 11:
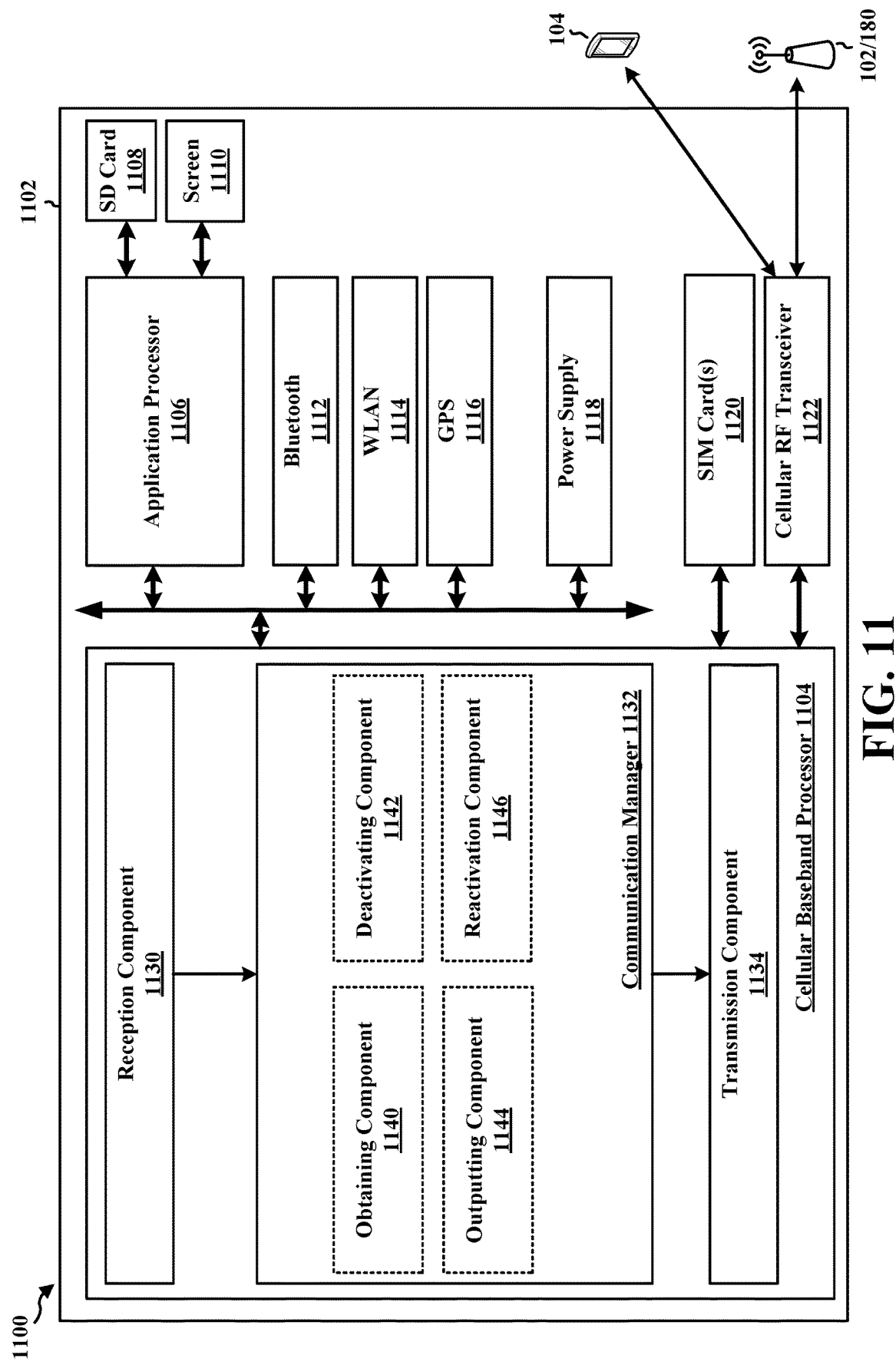
FIG. 11 is a diagram illustrating another example of a hardware implementation for another example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 104 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 104 of FIG. 3) and include the aforementioned additional modules of the apparatus 1102.

The communication manager 1132 includes an obtaining component 1140 that is configured to obtain, from a base station, an uplink gap pattern (ULGP) configuration indicating a first ULGP associated with a first time window, wherein the first ULGP is indicative of a distribution of one or more uplink slots activated as uplink gaps within the first time window, and wherein the apparatus is configured to refrain from outputting, for transmission to the base station, signaling at the one or more uplink slots activated as uplink gaps, e.g., as described in connection with the first step 1002 of FIG. 10.

The communication manager 1132 further includes a deactivating component 1142 that is configured to deactivate a first uplink gap of a first uplink slot of the one or more uplink slots, the deactivation based on detection of a communication event corresponding to the first uplink slot; and deactivate a second uplink gap of a second uplink slot of the plurality of uplink slots within the first window, the first uplink slot occurring prior to the second uplink slot, e.g., as described in connection with the third step 1006 of FIG. 10.

The communication manager 1132 further includes a outputting component 1144 configured output, for transmission to the base station, a first signal via the first uplink slot in response to the communication event; and output, for transmission to the base station, a second signal via the second uplink slot in response to the communication event, wherein the first signal and the second signal are configured to complete a random access procedure with the base station, e.g., as described in connection with the fourth step 1008 and the fifth step 1010 of FIG. 10.

The communication manager 1132 further includes a reactivating component 1146 configured to reactivate the second uplink gap if the random access procedure is completed prior to the second uplink slot, e.g., as described in connection with the sixth step 1012 of FIG. 10.

The apparatus may include additional components that perform each of the blocks of the algorithm in the aforementioned call-flow diagram and flowchart of FIGS. 8 and 10. As such, each block and/or communication in FIGS. 8 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for obtaining, from a base station, an uplink gap pattern (ULGP) configuration indicating a first ULGP associated with a first time window, wherein the first ULGP is indicative of a distribution of one or more uplink slots activated as uplink gaps within the first time window, and wherein the apparatus is configured to refrain from outputting, for transmission to the base station, signaling at the one or more uplink slots activated as uplink gaps; means for deactivating a first uplink gap of a first uplink slot of the one or more uplink slots, the deactivation based on detection of a communication event corresponding to the first uplink slot; means for outputting, for transmission to the base station, a first signal via the first uplink slot in response to the communication event; means for deactivating a second uplink gap of a second uplink slot of the plurality of uplink slots within the first window, the first uplink slot occurring prior to the second uplink slot; means for outputting, for transmission to the base station, a second signal via the second uplink slot in response to the communication event, wherein the first signal and the second signal are configured to complete a random access procedure with the base station; and means for reactivating the second uplink gap if the random access procedure is completed prior to the second uplink slot.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
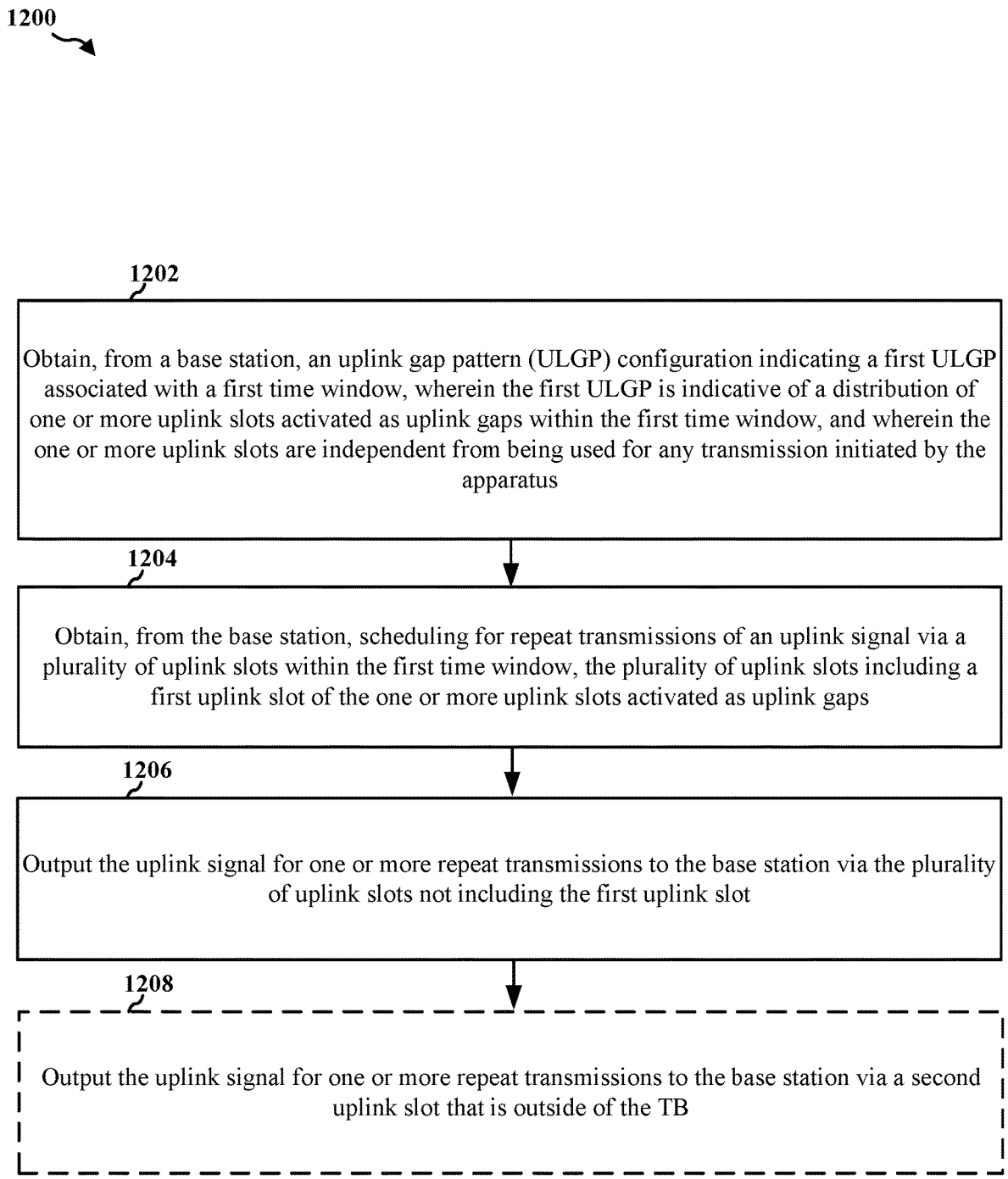
FIG. 12 is a flowchart of a method of wireless communication performed by a UE.

FIG. 12 is a flowchart 1200 of a method of wireless communication. The method may be performed by a UE (e.g., the UE 104; the apparatus 1102).

At a first step 1202, the UE may obtain, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the apparatus. For example, the first step 1202 may be performed by an obtaining component 1340 of FIG. 13. Here, the UE receive or obtain uplink gap configuration information from the base station. For example, the base station may provide the UE with one or more ULGPs, as well as a UGL and a UGRP corresponding to each of the one or more ULGPs. Each of the one or more ULGPs may include a default distribution of uplink gaps within a corresponding UGRP; however, the UE may uniformly distribute the uplink gaps within the UGRP.

At a second step 1204, the UE may obtain, from the base station, scheduling for repeat transmissions of an uplink signal via a plurality of uplink slots within the first time window, the plurality of uplink slots including a first uplink slot of the one or more uplink slots activated as uplink gaps. For example, the second step 1204 may be performed by the obtaining component 1340 of FIG. 13. Here, the UE may be configured with a TB comprising multiple uplink slots that the UE is configured to use to transmit an uplink signal repeatedly. However, because one of the multiple uplink slots is configured as an uplink gap and the UE cannot transmit over an uplink slot configured as an uplink gap, the UE may choose between a number of options for transmitting the repeated uplink signals.

At a third step 1206, the UE may output the uplink signal for one or more of the repeat transmissions to the base station via the plurality of uplink slots not including the first uplink slot. For example, the third step 1206 may be performed by the outputting component 1342 of FIG. 13. Here, the UE may determine not to deactivate the uplink gap configuration of the uplink slot. Accordingly, the UE may skip the uplink gap slot and send fewer repetitions of the uplink signal that are possible with the configured TB. In other words, the UE may allow the uplink gap to puncture the repeat uplink transmission schedule configured by the base station.

At a fourth step 1208, the UE may optionally output the uplink signal for one or more of the repeat transmissions to the base station via a second uplink slot that is outside of the TB. For example, the third step 1206 may be performed by the outputting component 1342 of FIG. 13. Here, because the UE skipped the uplink gap slot and transmitted fewer repeated transmissions of the uplink signal, the UE may rate match the punctured signal and transmit an additional repeat of the uplink signal using an uplink slot outside of the TB.

Figure 13:
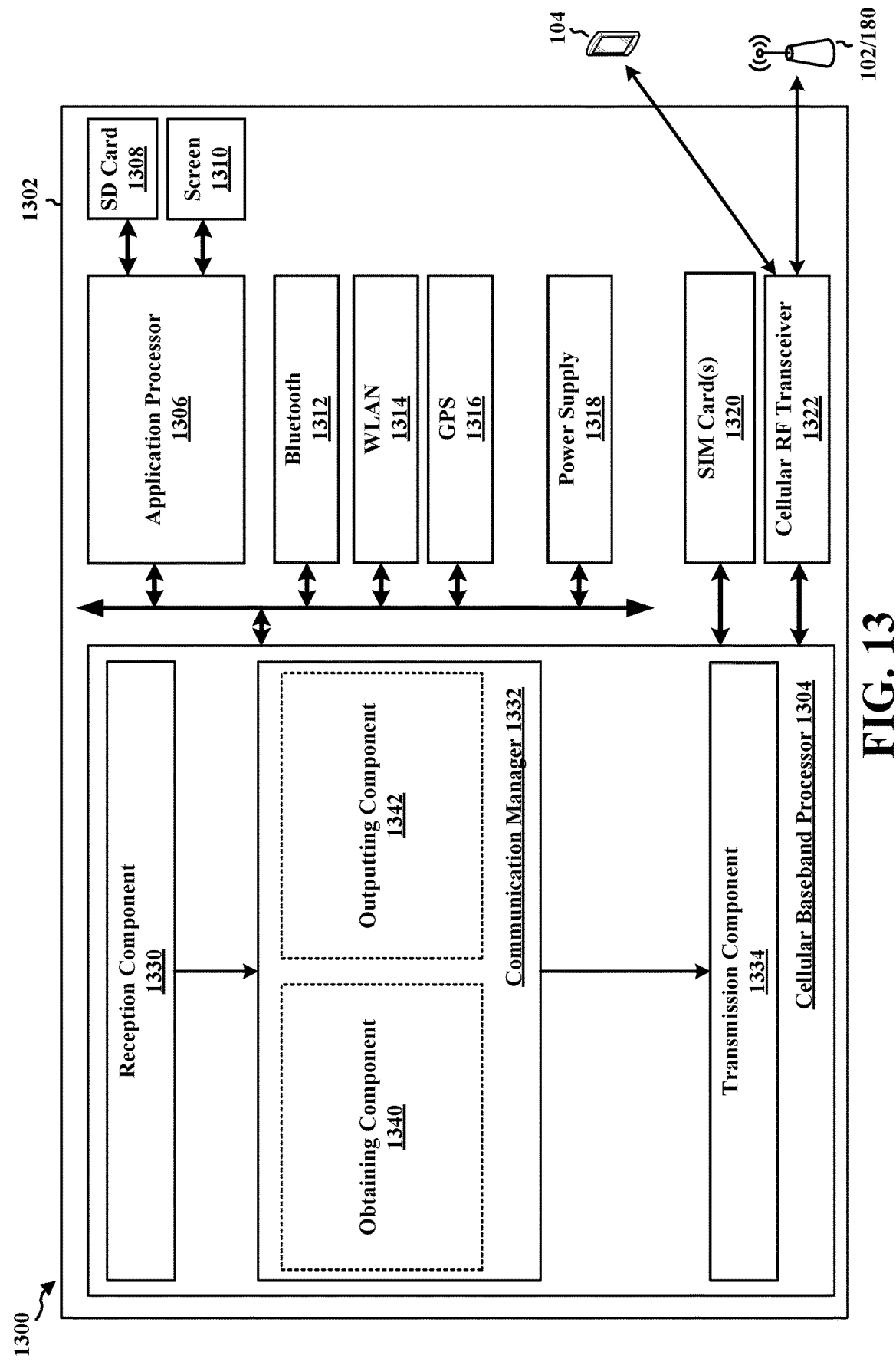
FIG. 13 is a diagram illustrating another example of a hardware implementation for another example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 104 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 104 of FIG. 3) and include the aforementioned additional modules of the apparatus 1302.

The communication manager 1332 includes an obtaining component 1340 that is configured to obtain, from a base station, an uplink gap pattern (ULGP) configuration indicating a first ULGP associated with a first time window, wherein the first ULGP is indicative of a distribution of one or more uplink slots activated as uplink gaps within the first time window, and wherein the apparatus is configured to refrain from outputting, for transmission to the base station, uplink signaling at the one or more uplink slots activated as uplink gaps; and obtain, from a base station, scheduling for repeat transmissions of an uplink signal via a plurality of uplink slots including a first uplink slot activated as a first uplink gap, e.g., as described in connection with the first step 1202 and the second step 1204 of FIG. 12.

The communication manager 1332 further includes an outputting component 1342 that is configured to output the uplink signal for repeat transmission to the base station via the plurality of uplink slots not including the first uplink slot activated as the first uplink gap; and output the uplink signal for repeat transmission to the base station via a second uplink slot that is outside of the TB, e.g., as described in connection with the third step 1206 and the fourth step 1208 of FIG. 12.

The apparatus may include additional components that perform each of the blocks of the algorithm in the aforementioned call-flow diagram and flowchart of FIGS. 9 and 12. As such, each block and/or communication in FIGS. 9 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for obtaining, from a base station, an uplink gap pattern (ULGP) configuration indicating a first ULGP associated with a first time window, wherein the first ULGP is indicative of a distribution of one or more uplink slots activated as uplink gaps within the first time window, and wherein the apparatus is configured to refrain from outputting, for transmission to the base station, uplink signaling at the one or more uplink slots activated as uplink gaps; means for obtaining, from a base station, scheduling for repeat transmissions of an uplink signal via a plurality of uplink slots including a first uplink slot activated as a first uplink gap; means for outputting the uplink signal for repeat transmission to the base station via the plurality of uplink slots not including the first uplink slot activated as the first uplink gap; and means for outputting the uplink signal for repeat transmission to the base station via a second uplink slot that is outside of the TB.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Additional Considerations

Means for receiving or means for obtaining may include a receiver (e.g., the receive processor 356 or antenna(s) 352) of the UE 120 illustrated in FIG. 3. Means for transmitting or means for outputting may include a transmitter (e.g., the transmit processor 368 or antenna(s) 352) of the UE 120 illustrated in FIG. 3. Means for activating or means for reactivating, means for deactivating, means for detecting, and/or means for performing may include a processing system, which may include one or more processors, such as the receive processor 356, the transmit processor 368, or the controller 359 of the UE 120 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the terms "deactivating," "reactivating," and/or "detecting" (or any variants thereof) encompass a wide variety of actions. For example, "deactivating" may include inactivate. In another example, "reactivating" may include restore. In some examples, "detecting" may include computing, processing, sensing, deriving, investigating, looking up (e.g., looking up in a table, a database or another data structure), ascertaining and the like.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method of wireless communications at a user equipment (UE), comprising: obtaining, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the UE; detecting a communication event corresponding to a first uplink slot of the one or more uplink slots; deactivating the first uplink slot of the one or more uplink slots in response to the communication event; and outputting, for transmission to the base station, a first signal via the first uplink slot in response to the communication event.

Example 2 is the method of example 1, wherein the communication event comprises an expiration of a time alignment (TA) timer.

Example 3 is the method of any of examples 1 and 2, wherein the first signal is configured to initiate a random access procedure with the base station.

Example 4 is the method of example 1, wherein the communication event comprises a downlink transmission from the base station in response to an expiration of a time alignment (TA) timer.

Example 5 is the method of example 4, wherein the downlink transmission comprises a command configured to instruct the apparatus to initiate a random access procedure with the base station.

Example 6 is the method of example 1, wherein the communication event comprises a failure of a radio link between the apparatus and the base station, and wherein the first signal is configured to initiate a random-access procedure with the base station.

Example 7 is the method of example 1, wherein the communication event comprises a failure of a beam used by the apparatus for communication with the base station.

Example 8 is the method of example 7, wherein the first signal is configured to initiate a random access procedure with the base station.

Example 9 is the method of example 1, wherein the communication event comprises an uplink transmission scheduled at the first uplink slot by a configured grant, and wherein the first signal via the first uplink slot comprises the uplink transmission.

Example 10 is the method of any of examples 1-9, further comprising deactivating a second uplink slot of the one or more uplink slots within the first time window, the first uplink slot occurring prior to the second uplink slot; and outputting, for transmission to the base station, a second signal via the second uplink slot in response to the communication event, wherein the first signal and the second signal are configured to complete a random access procedure with the base station; or reactivating the second uplink slot if the random access procedure is completed prior to the second uplink slot.

Example 11 is a method of wireless communications at a user equipment (UE), comprising: obtaining, from a base station, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the UE; obtaining, from the base station, scheduling for repeat transmissions of an uplink signal via a plurality of uplink slots within the first time window, the plurality of uplink slots including a first uplink slot of the one or more uplink slots activated as uplink gaps; and outputting the uplink signal for one or more of the repeat transmissions to the base station via the plurality of uplink slots not including the first uplink slot.

Example 12 is the method of example 11, wherein the scheduling for repeat transmissions of the uplink signal comprises an indication of a transport block (TB) comprising the plurality of uplink slots.

Example 13 is the method of example 12, further comprising outputting the uplink signal for one or more of the repeat transmissions to the base station via a second uplink slot that is outside of the TB.

Example 14 is the method of example 13, wherein the second uplink slot is a consecutive uplink slot relative to another uplink slot of the plurality of uplink slots.

Example 15 is a user equipment (UE), comprising: at least one transceiver; a memory comprising instructions; and one or more processors configured to execute the instructions to cause the UE to perform a method in accordance with any of examples 1-10, wherein the at least one transceiver is configured to receive, from a base station, the ULGP configuration; and transmit the first signal via the first uplink slot in response to the communication event.

Example 16 user equipment (UE), comprising: at least one transceiver; a memory comprising instructions; and one or more processors configured to execute the instructions to cause the UE to perform a method in accordance with any of examples 11-14, wherein the at least one transceiver is configured to receive the ULGP configuration; receive the scheduling for repeat transmissions of the uplink signal; and transmit the uplink signal for the one or more repeat transmissions.

Example 17 is an apparatus for wireless communications, comprising means for performing a method in accordance with any one of examples 1-10.

Example 18 is an apparatus for wireless communications, comprising means for performing a method in accordance with any one of examples 11-14.

Example 19 is a non-transitory computer-readable medium comprising instructions that, when executed by an apparatus, cause the apparatus to perform a method in accordance with any one of examples 1-10.

Example 20 is a non-transitory computer-readable medium comprising instructions that, when executed by an apparatus, cause the apparatus to perform a method in accordance with any one of examples 11-14.

What is claimed is:

1. An apparatus for wireless communications, comprising:
at least one memory comprising instructions; and
one or more processors configured to execute the instructions to cause the apparatus to:
obtain an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the apparatus; and
output, for transmission, a first signal via a first uplink slot of the one or more uplink slots in response to a communication event corresponding to the first uplink slot.

2. The apparatus of claim 1, wherein the communication event comprises an expiration of a time alignment (TA) timer.

3. The apparatus of claim 2, wherein the first signal is configured to initiate a random access procedure with a base station.

4. The apparatus of claim 1, wherein the communication event comprises a downlink transmission from a base station in response to an expiration of a time alignment (TA) timer.

5. The apparatus of claim 4, wherein the downlink transmission comprises a command configured to instruct the apparatus to initiate a random access procedure with the base station.

6. The apparatus of claim 1, wherein the communication event comprises a failure of a radio link between the apparatus and a base station, and wherein the first signal is configured to initiate a random-access procedure with the base station.

7. The apparatus of claim 1, wherein the communication event comprises a failure of a beam used by the apparatus for communication with a base station.

8. The apparatus of claim 7, wherein the first signal is configured to initiate a random-access procedure with the base station.

9. The apparatus of claim 1, wherein the communication event comprises an uplink transmission scheduled at the first uplink slot by a configured grant, and wherein the first signal output for transmitting via the first uplink slot comprises the uplink transmission.

10. The apparatus of claim 1, wherein the one or more processors are further configured to execute the instructions to cause the apparatus to:
deactivate a second uplink slot of the one or more uplink slots within the first time window, the first uplink slot occurring prior to the second uplink slot; and
output, for transmission, a second signal via the second uplink slot in response to the communication event, wherein the first signal and the second signal are configured to complete a random access procedure with a base station; or
reactivate the second uplink slot if the random access procedure is completed prior to the second uplink slot.

11. The apparatus of claim 1, further comprising at least one transceiver configured to:
receive, from a base station, the ULGP configuration; and
transmit the first signal via the first uplink slot in response to the communication event, wherein the apparatus is configured as a user equipment (UE).

12. An apparatus for wireless communications, comprising:
at least one memory comprising instructions; and
one or more processors configured to execute the instructions to cause the apparatus to:
obtain an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the apparatus;
obtain scheduling for repeat transmissions of an uplink signal via a plurality of uplink slots within the first time window, the plurality of uplink slots including a first uplink slot of the one or more uplink slots activated as uplink gaps; and
output, for transmission, the uplink signal associated with at least one of the repeat transmissions via at least one of the plurality of uplink slots not including the first uplink slot.

13. The apparatus of claim 12, wherein the scheduling for repeat transmissions of the uplink signal comprises an indication of a transport block (TB) comprising the plurality of uplink slots.

14. The apparatus of claim 13, wherein the one or more processors are further configured to execute the instructions to cause the apparatus to output the uplink signal associated with the at least one of the repeat transmissions via a second uplink slot that is outside of the TB.

15. The apparatus of claim 14, wherein the second uplink slot is a consecutive uplink slot relative to another uplink slot of the plurality of uplink slots.

16. A user equipment (UE), comprising:
   at least one transceiver;
   at least one memory comprising instructions; and
   one or more processors configured to execute the instructions to cause the UE to:
   receive, via the at least one transceiver, an uplink gap pattern (ULGP) configuration indicating a first ULGP associated with a first time window, wherein the first ULGP is indicative of a distribution of one or more uplink slots activated as uplink gaps within the first time window, and wherein the one or more uplink slots are independent from being used for any transmission initiated by the UE;
   receive, via the at least one transceiver, scheduling for repeat transmissions of an uplink signal via a plurality of uplink slots within the first time window, the plurality of uplink slots including a first uplink slot of the one or more uplink slots activated as uplink gaps; and
   transmit, via the at least one transceiver, the uplink signal associated with at least one of the repeat transmissions via at least one of the plurality of uplink slots not including the first uplink slot.

17. The UE of claim 16, wherein the scheduling for repeat transmissions of the uplink signal comprises an indication of a transport block (TB) comprising the plurality of uplink slots.

18. The UE of claim 17, wherein the one or more processors are further configured to execute the instructions to cause the UE to output the uplink signal associated with the at least one of the repeat transmissions via a second uplink slot that is outside of the TB.

19. The UE of claim 18, wherein the second uplink slot is a consecutive uplink slot relative to another uplink slot of the plurality of uplink slots.

20. The UE of claim 16, wherein the ULGP configuration is received via a control channel.

* * * * *